US012634726B2

(12) United States Patent
Liu et al.

(10) Patent No.: US 12,634,726 B2
(45) Date of Patent: May 19, 2026

(54) METHOD FOR DETERMINING HYBRID AUTOMATIC REPEAT REQUEST-ACKNOWLEDGMENT (HARQ-ACK) RESOURCE

(71) Applicant: HUAWEI TECHNOLOGIES CO., LTD., Guangdong (CN)

(72) Inventors: Xianda Liu, Beijing (CN); Kunpeng Liu, Beijing (CN); Lixia Xue, Beijing (CN); Xiang Gao, Beijing (CN); Xu Zhang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 435 days.

(21) Appl. No.: 17/672,397

(22) Filed: Feb. 15, 2022

(65) Prior Publication Data

US 2022/0174523 A1      Jun. 2, 2022

Related U.S. Application Data

(63) Continuation of application No. PCT/CN2020/109297, filed on Aug. 14, 2020.

(30) Foreign Application Priority Data

Aug. 16, 2019    (CN) .......................... 201910760503.1

(51) Int. Cl.
*H04W 72/00* (2023.01)
*H04L 1/1812* (2023.01)
(Continued)

(52) U.S. Cl.
CPC ........... *H04W 24/08* (2013.01); *H04L 1/1812* (2013.01); *H04L 5/0053* (2013.01);
(Continued)

(58) Field of Classification Search
CPC ............. H04W 24/08; H04W 72/0446; H04W 72/1273; H04W 72/23; H04W 72/20;
(Continued)

(56) References Cited

U.S. PATENT DOCUMENTS 12,231,243 B2 *  2/2025  Yang ..................... H04L 1/1812
2010/0054145 A1 *  3/2010  Frenger ............... H04W 72/542
370/252
(Continued)

FOREIGN PATENT DOCUMENTS

AU       2019202687 A1     5/2019
CN       103688504 A       3/2014
(Continued)

OTHER PUBLICATIONS

CATT (UL control enhancements for URLLC, R1-1900332, Jan. 2019).*
(Continued)

*Primary Examiner* — Lakeram Jangbahadur
(74) *Attorney, Agent, or Firm* — Fish & Richardson P.C.

(57) ABSTRACT

This application provides methods and apparatuses for determining a hybrid automatic repeat request-acknowledgment (HARQ-ACK) resource. One method includes: determining at least one physical downlink control channel (PDCCH) monitoring occasion, wherein HARQ-ACK feedback bits scheduled by using downlink control information (DCI) monitored on the at least one PDCCH monitoring occasion are carried on a same physical uplink control channel (PUCCH) resource; and determining, based on index values of a control-resource set group corresponding to first DCI, target DCI indicating the PUCCH resource, wherein the first DCI is on a last PDCCH monitoring (Continued)

occasion in the at least one PDCCH monitoring occasion, and wherein the control-resource set group comprises one or more control-resource sets.

16 Claims, 10 Drawing Sheets

(51) Int. Cl.

| | | |
|---|---|---|
| *H04L 5/00* | (2006.01) | |
| *H04W 24/08* | (2009.01) | |
| *H04W 72/0446* | (2023.01) | |
| *H04W 72/1273* | (2023.01) | |
| *H04W 72/23* | (2023.01) | |

(52) U.S. Cl.
CPC ... *H04W 72/0446* (2013.01); *H04W 72/1273* (2013.01); *H04W 72/23* (2023.01)

(58) Field of Classification Search
CPC ... H04L 1/1812; H04L 5/0053; H04L 1/1861; H04L 1/1896; H04L 1/1822; H04L 1/1854; H04L 5/0055; H04L 5/0008
See application file for complete search history.

(56) References Cited

U.S. PATENT DOCUMENTS

| | | | | |
|---|---|---|---|---|
| 2016/0234831 | A1* | 8/2016 | Tian | H04W 72/121 |
| 2017/0288838 | A1* | 10/2017 | Cariou | H04L 5/0057 |
| 2019/0045460 | A1 | 2/2019 | Muruganathan et al. | |
| 2019/0103943 | A1* | 4/2019 | Wang | H04L 1/1854 |
| 2020/0154443 | A1* | 5/2020 | Patil | H04W 72/30 |
| 2020/0351129 | A1* | 11/2020 | Kwak | H04W 76/27 |
| 2021/0014883 | A1* | 1/2021 | Khoshnevisan | H04W 72/23 |

FOREIGN PATENT DOCUMENTS

| | | | | |
|---|---|---|---|---|
| CN | 103873212 | A | 6/2014 | |
| CN | 104303446 | A | 1/2015 | |
| CN | 104782208 | A | 7/2015 | |
| CN | 106059719 | A | 10/2016 | |
| CN | 106165485 | A | 11/2016 | |
| CN | 106357374 | A | 1/2017 | |
| CN | 107104780 | A | 8/2017 | |
| CN | 107332646 | A | 11/2017 | |
| CN | 109586877 | A | 4/2019 | |
| CN | 110035524 | A | 7/2019 | |
| CN | 110086579 | A | 8/2019 | |
| EP | 4009562 | A1 * | 6/2022 | ............ H04W 72/23 |
| WO | 2012020954 | A1 | 2/2012 | |
| WO | 2018204491 | A1 | 11/2018 | |

OTHER PUBLICATIONS

CATT, "UL Control Enhancements for URLLC," 3GPP TSG RAN WG1 Ad-Hoc Meeting 1901, R1-1900332, Taipei, Jan. 21-25, 2019, 8 pages.
Extended European Search Report issued in European Application No. 20853645.8 on Sep. 8, 2022, 8 pages.
Huawei, HiSilicon, "Remaining Issues on NR CA," 3GPP TSG RAN WG1 Meeting #93, R1-1805895, Busan, Korea, May 21-25, 2018, 9 pages.
NTT Docomo, Inc., "Enhancements on multi-TRP/panel transmission," 3GPP TSG RAN WG1 #97, R1-1906224, Reno, USA, May 13-17, 2019, 32 pages.
3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.
3GPP TS 38.214 V15.6.0 (Jun. 2019), "3rd Generation Partnership Project; Technical Specification Group Radio Access Network; NR; Physical layer procedures for data(Release 15)," Jun. 2019, 105 pages.
Ericsson, "M-PDCCH-based PUCCH resource allocation for MTC," 3GPP TSG RAN WG1 Meeting #82, R1-153736, Beijing, China, Aug. 24-28, 2015, 3 pages.
Office Action issued in Chinese Application No. 201910760503.1 on Jul. 20, 2021, 17 pages (with English translation).
PCT International Search Report and Written Opinion issued in International Application No. PCT/CN2020/109297 on Nov. 19, 2020, 16 pages (with English translation).
Samsung, "HARQ-ACK Transmission in Response to E-PDCCH Detection," 3GPP TSG RAN WG1 #68, R1-120193, Dresden, Germany, Feb. 6-10, 2012, 3 pages.
Sheu et al., "A Go-back-N HARQ time bundling for Machine Type Communication devices in LTE TDD," 2013 IEEE Wireless Communications and Networking Conference (WCNC), Jul. 15, 2013, 6 pages.
Office Action issued in Indian Application No. 202217012237 on Jul. 13, 2022, 6 pages.

* cited by examiner

Carrier 1

| DCI 1 DAI=1 PUCCH 1 | DCI 3 DAI=2 PUCCH 2 |

Carrier 2

| DCI 2 DAI=3 PUCCH 3 | DCI 4 DAI=4 PUCCH 4 |

Monitoring occasion 1     Monitoring occasion 2

PUCCH

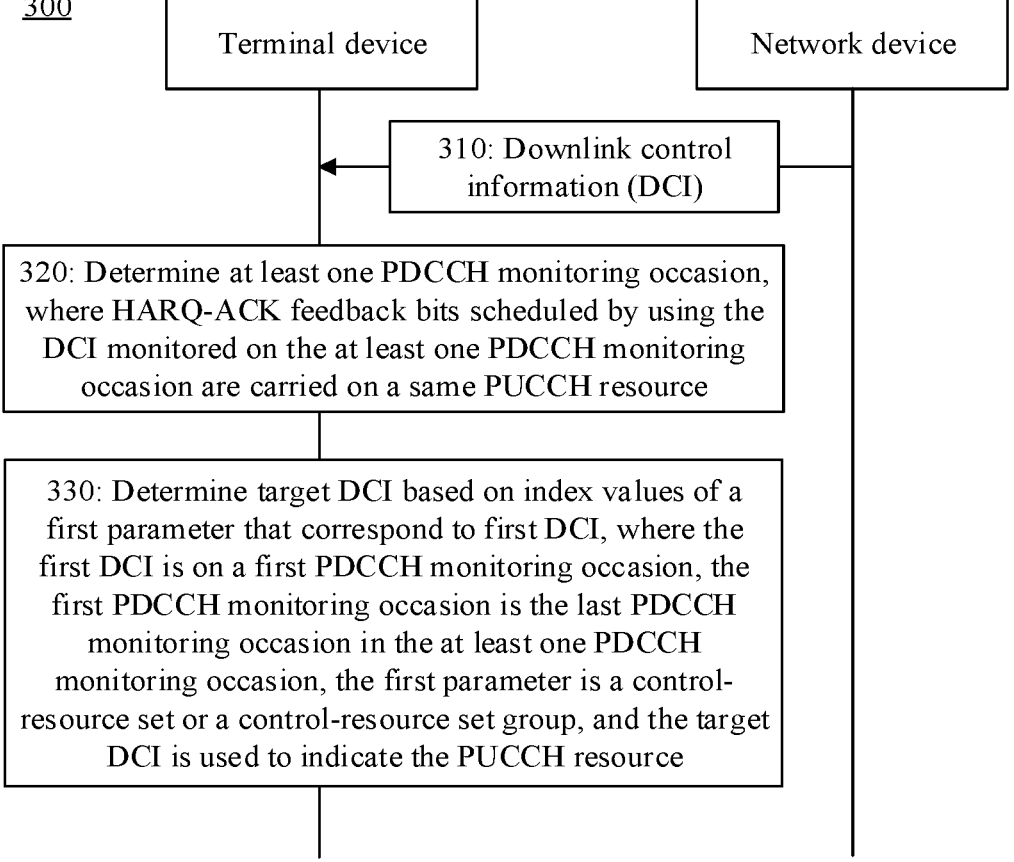

300

Terminal device

Network device

310: Downlink control information (DCI)

320: Determine at least one PDCCH monitoring occasion, where HARQ-ACK feedback bits scheduled by using the DCI monitored on the at least one PDCCH monitoring occasion are carried on a same PUCCH resource 330: Determine target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource

FIG. 3

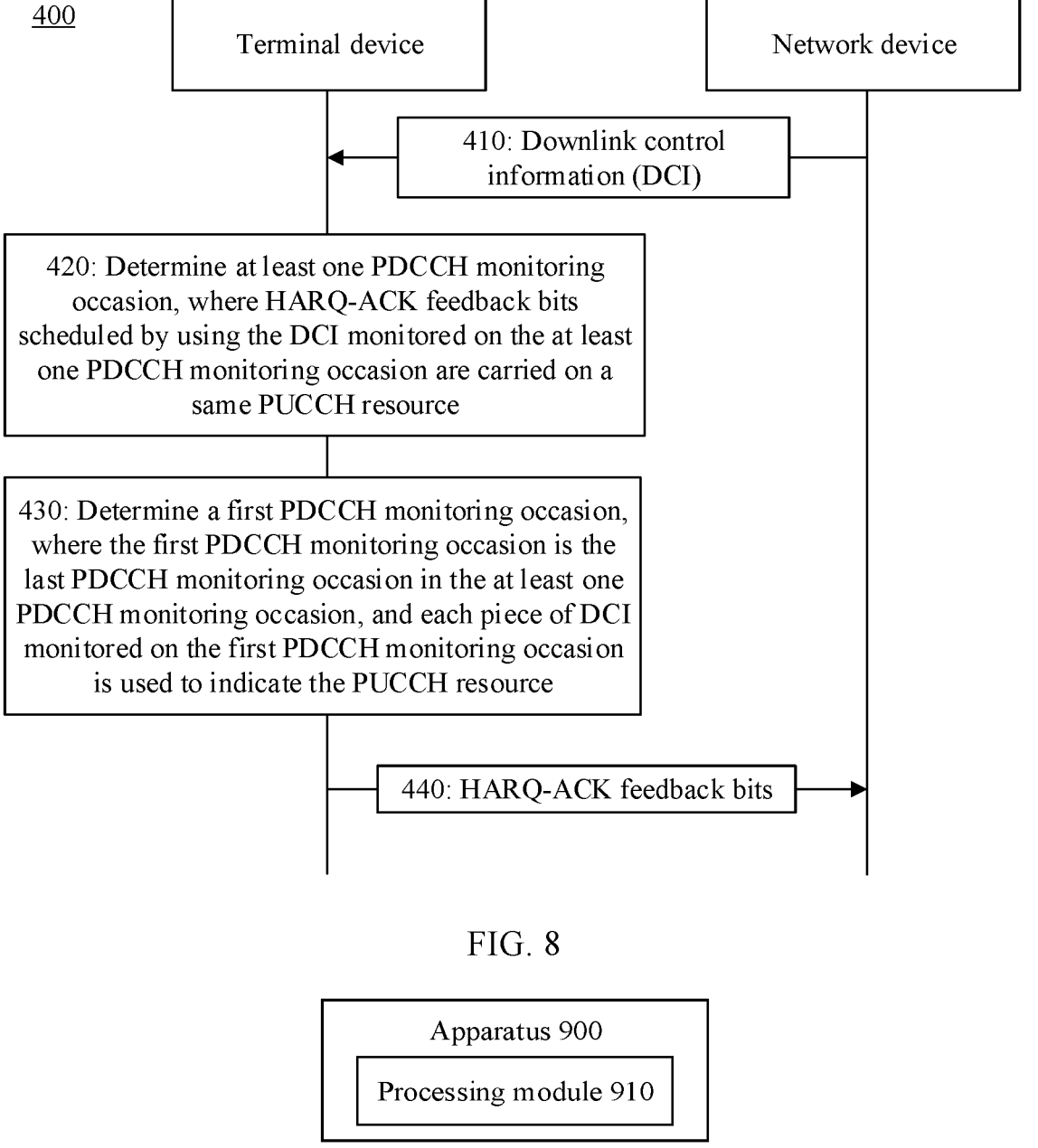

400

Terminal device

Network device

410: Downlink control information (DCI)

420: Determine at least one PDCCH monitoring occasion, where HARQ-ACK feedback bits scheduled by using the DCI monitored on the at least one PDCCH monitoring occasion are carried on a same PUCCH resource 430: Determine a first PDCCH monitoring occasion, where the first PDCCH monitoring occasion is the last PDCCH monitoring occasion in the at least one PDCCH monitoring occasion, and each piece of DCI monitored on the first PDCCH monitoring occasion is used to indicate the PUCCH resource 440: HARQ-ACK feedback bits

FIG. 8

Apparatus 900

Processing module 910

FIG. 9

METHOD FOR DETERMINING HYBRID AUTOMATIC REPEAT REQUEST-ACKNOWLEDGMENT (HARQ-ACK) RESOURCE

CROSS-REFERENCE TO RELATED APPLICATIONS

This application is a continuation of International Application No. PCT/CN2020/109297, filed on Aug. 14, 2020, which claims priority to Chinese Patent Application No. 201910760503.1, filed on Aug. 16, 2019. The disclosures of the aforementioned applications are hereby incorporated by reference in their entireties.

TECHNICAL FIELD

This application relates to the communications field, and in particular, to a method for determining a hybrid automatic repeat request-acknowledgment (HARQ-ACK) resource in the communications field.

BACKGROUND

In downlink transmission, a terminal device may simultaneously communicate with one or more network devices. That is, the terminal device simultaneously receives a plurality of physical downlink shared channels (Physical Downlink Shared Channel, PDSCH). The transmission mode is referred to as coordinated multipoint transmission/reception (Coordinated Multiple Points Transmission/Reception, CoMP). Network devices in a coordinating cluster may be separately connected to different control nodes. The control nodes may exchange information with each other, for example, exchange scheduling policy information, to achieve an objective of coordinated transmission/reception. Alternatively, all network devices in a coordinating cluster are connected to a same control node. Each network device separately indicates scheduling of data of one terminal device by using downlink control information (Downlink Control Information, DCI) signaling carried on an independent physical downlink control channel (Physical Downlink Control Channel, PDCCH).

DCI separately delivered by the network devices may be used to separately schedule PDSCHs. Hybrid automatic repeat request-acknowledgment (Hybrid Automatic Repeat request Acknowledgment, HARQ-ACK) information of a plurality of PDSCHs may be fed back in a unified manner. To be specific, the HARQ-ACK information is carried on a same physical uplink control channel (Physical Uplink Control Channel, PUCCH) resource to jointly code feedback bits. Because a plurality of pieces of DCI for feeding back HARQ-ACKs in a unified manner may all carry a PUCCH resource indication field and be used to independently indicate a PUCCH resource, a terminal device needs to determine a PUCCH resource that carries the HARQ-ACK bits that are fed back in a unified manner.

In an existing mechanism, a definition is that a PUCCH resource indicated by using DCI on a PDCCH monitoring (monitoring) occasion (occasion) having a largest number is used as an uplink resource for carrying a HARQ-ACK feedback. If a CoMP mechanism is supported, a same PDCCH monitoring occasion may include a plurality of pieces of DCI. Therefore, the terminal device cannot determine a piece of DCI, where a PUCCH resource indicated by using the DCI is actually used to carry the HARQ-ACK feedback bits.

SUMMARY

This application provides a method for determining a hybrid automatic repeat request-acknowledgment (HARQ-ACK) resource, so that a network device can control a PUCCH resource used for a HARQ-ACK feedback of a terminal device, to improve uplink transmission performance and avoid interference in uplink transmission.

According to a first aspect, a method for determining a hybrid automatic repeat request-acknowledgment (HARQ-ACK) resource is provided, and includes: determining at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource; and determining target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

It should be understood that, that HARQ-ACK feedback bits scheduled by using DCI monitored on the at least one PDCCH monitoring occasion are carried on a same PUCCH resource may be that time domain resource locations that are of HARQ-ACK feedbacks and that are indicated by using the DCI monitored on the at least one PDCCH monitoring occasion are the same. A time domain resource may be a slot (slot), a sub-slot (sub-slot), or an orthogonal frequency division multiplexing OFDM symbol group.

Optionally, a terminal device may determine the at least one PDCCH monitoring occasion based on time domain resource locations occupied by HARQ-ACK feedbacks and corresponding to DCI monitored on a plurality of PDCCH monitoring occasions.

Optionally, the terminal device may determine, based on a time domain resource location that is occupied by a physical downlink shared channel (PDSCH) and that is indicated by using DCI and a HARQ-ACK feedback delay corresponding to the PDSCH, a time domain resource occupied by a HARQ-ACK, where the HARQ-ACK feedback delay is an interval from an end time domain location occupied by the PDSCH to a start time domain location occupied by the HARQ-ACK feedback.

With reference to the first aspect, in a possible implementation, after the determining at least one PDCCH monitoring occasion, the method further includes: sorting the at least one PDCCH monitoring occasion based on time domain locations of the DCI monitored on the at least one determined PDCCH monitoring occasion.

With reference to the first aspect, in a possible implementation, the sorting the at least one PDCCH monitoring occasion based on time domain locations of the DCI monitored on the at least one determined PDCCH monitoring occasion includes: sorting the at least one PDCCH monitoring occasion based on a sequence of the time domain locations of the DCI monitored on the at least one determined PDCCH monitoring occasion.

In this case, the last PDCCH monitoring occasion in the at least one PDCCH monitoring occasion is a PDCCH monitoring occasion having a largest number in time domain in the at least one PDCCH monitoring occasion.

With reference to the first aspect, in a possible implementation, the sorting the at least one PDCCH monitoring occasion based on time domain locations of the DCI monitored on the at least one determined PDCCH monitoring occasion includes: sorting the at least one PDCCH monitoring occasion based on a sequence of start moments of search space of the DCI monitored on the at least one determined PDCCH monitoring occasion, where a PDCCH monitoring occasion corresponding to an earlier start moment of search space has a smaller sequence number.

In this case, the last PDCCH monitoring occasion in the at least one PDCCH monitoring occasion is a PDCCH monitoring occasion corresponding to a latest start moment of search space corresponding to the at least one PDCCH monitoring occasion.

Optionally, the start moment of the search space is determined based on at least a PDCCH monitoring periodicity and a monitoring periodicity offset that are configured in the search space.

It should be understood that the first DCI is on a first PDCCH monitoring occasion is that the first DCI is DCI monitored on the first PDCCH monitoring occasion or that the first PDCCH monitoring occasion is determined based on a time domain location occupied by the first DCI.

Optionally, there may be one or more pieces of first DCI.

Optionally, the first DCI is any DCI on the last PDCCH monitoring occasion in the at least one PDCCH monitoring occasion.

Optionally, the first DCI is located on a same carrier.

Optionally, the first DCI may be any DCI that is on a first carrier on the last PDCCH monitoring occasion in the at least one PDCCH monitoring occasion. The first carrier has a largest carrier number in the last PDCCH monitoring occasion, the first carrier has a smallest carrier number in the last PDCCH monitoring occasion, or the first carrier is any carrier in the last PDCCH monitoring occasion.

With reference to the first aspect, in a possible implementation, before the determining target DCI based on index values of a first parameter that correspond to first DCI, the method further includes: determining, by the terminal device based on configuration information of the monitored first DCI, the index values of the first parameter that correspond to the first DCI, for example, determining the index values of the first parameter based on a resource location occupied by the monitored first DCI.

For example, when the terminal device monitors the first DCI based on an index value 1 of a control-resource set or a control-resource set group, the index value that corresponds to the first DCI and that is of the control-resource set or the control-resource set group is 1.

Optionally, the first parameter may alternatively be a PUCCH resource or a PUCCH resource group. Specifically, the terminal device determines, based on a PUCCH resource indicated by using the monitored first DCI or a PUCCH resource group to which the PUCCH resource belongs, an index value that corresponds to the first DCI and that is of the PUCCH resource or the PUCCH resource group. For example, when the PUCCH resource indicated by using the first DCI monitored by the terminal device belongs to a PUCCH resource group 1, the index value that corresponds to the first DCI and that is of the PUCCH resource or the PUCCH resource group is 1.

Optionally, the first parameter may alternatively be a HARQ process number or a HARQ process number group. Specifically, the terminal device determines, based on a HARQ process number indicated by using the monitored first DCI or a HARQ process number group to which the HARQ process number belongs, an index value that corresponds to the first DCI and that is of the HARQ process number or the HARQ process number group. For example, when the HARQ process number indicated by using the first DCI monitored by the terminal device belongs to a HARQ process number group 1, the index value that corresponds to the first DCI and that is of the HARQ process number or the HARQ process number group is 1.

An index value that corresponds to DCI monitored on the last PDCCH monitoring occasion in the at least one determined PDCCH monitoring occasion and that is of a control-resource set or an index value that corresponds to the DCI and that is of the first parameter is used to determine a PUCCH resource carrying a HARQ-ACK feedback bit scheduled by using the DCI, so that a network device can control a PUCCH resource used for a HARQ-ACK feedback of the terminal device, to improve uplink transmission performance and avoid interference in uplink transmission.

With reference to the first aspect, in a possible implementation, before the determining at least one PDCCH monitoring occasion, the method further includes: performing, by the terminal device, blind detection on DCI.

Optionally, when the terminal device monitors a plurality of pieces of DCI, the plurality of pieces of DCI may be sent by one or more network devices. Specifically, the plurality of pieces of DCI may all be sent by a same network device. Alternatively, some of the plurality of pieces of DCI are sent by a same network device, and remaining DCI may be sent by different network devices. Alternatively, the plurality of pieces of DCI may all be sent by different network devices. For example, different quasi co-location (QCL) assumptions for receiving the plurality of pieces of DCI indicate that the plurality of pieces of DCI may be sent by different network devices, and same QCL assumptions for receiving the plurality of pieces of DCI indicate that the plurality of pieces of DCI may be sent by a same network device.

With reference to the first aspect, in a possible implementation, an index value that corresponds to the target DCI and that is of the first parameter is the largest one or the smallest one of the index values of the first parameter that correspond to the first DCI, or is a first index value, and the first index value is predefined in a protocol.

Optionally, an index value of the first parameter is configured by using higher layer signaling, for example, configured by using RRC signaling.

Optionally, an index value of the first parameter is configured in the first parameter.

Optionally, the terminal device monitors a plurality of pieces of DCI on the first PDCCH monitoring occasion, determines an index value that corresponds to each piece of DCI and that is of the first parameter, determines the target DCI based on the determined index values of the first parameter, and then sends the HARQ-ACK feedback bits based on the PUCCH resource indicated by using the target DCI.

Optionally, the terminal device first determines DCI that is on the at least one PDCCH monitoring occasion and that is on the first carrier, then determines DCI that is on the first carrier and that is on the first PDCCH monitoring occasion, and then determines, based on the index values of the first parameter, the target DCI in the DCI that is on the first carrier and that is on the first PDCCH monitoring occasion. The first carrier may be a carrier having a largest number or a carrier having a smallest number in configured carriers.

Optionally, the terminal device first determines DCI that is on the at least one PDCCH monitoring occasion and that is on the first PDCCH monitoring occasion, then determines DCI that is on the first PDCCH monitoring occasion and that is on the first carrier, and then determines, based on the index values of the first parameter, the target DCI in the DCI that is on the first PDCCH monitoring occasion and that is on the first carrier. The first carrier may be a carrier having a largest number or a carrier having a smallest number in configured carriers, or may be a carrier having a largest number or a carrier having a smallest number in carriers on the first PDCCH monitoring occasion.

Optionally, the terminal device first determines DCI that is on the at least one PDCCH monitoring occasion and that is on the first PDCCH monitoring occasion, then determines DCI that is on the first PDCCH monitoring occasion and that corresponds to a largest or smallest index value of the first parameter, and then determines, in the DCI, DCI on the first carrier as the target DCI. The first carrier may be a carrier having a largest number or a carrier having a smallest number in configured carriers, may be a carrier having a largest number or a carrier having a smallest number in carriers on the first PDCCH monitoring occasion, or may be a carrier having a largest number or a carrier having a smallest number in carriers corresponding to a largest or smallest index value of the first parameter on the first PDCCH monitoring occasion.

Optionally, the terminal device first determines DCI that is on the at least one PDCCH monitoring occasion and that corresponds to a largest or smallest index value of the first parameter, then determines, in the DCI, DCI on the first PDCCH monitoring occasion, and then determines, in the DCI, DCI on the first carrier as the target DCI. The first carrier may be a carrier having a largest number or a carrier having a smallest number in configured carriers, may be a carrier having a largest number or a carrier having a smallest number in carriers on the first PDCCH monitoring occasion, or may be a carrier having a largest number or a carrier having a smallest number in carriers corresponding to a largest or smallest index value of the first parameter on the first PDCCH monitoring occasion.

Optionally, the terminal device may directly obtain, from the first DCI, the index values of the first parameter that correspond to the first DCI. Alternatively, after monitoring the first DCI, the terminal device determines, based on the monitored first DCI, the corresponding index values of the first parameter that correspond to the first DCI.

With reference to the first aspect, in a possible implementation, the method further includes: determining, based on a DAI value indicated by using the target DCI, a quantity of the HARQ-ACK bits carried on the same PUCCH resource.

Optionally, the DAI value indicated by using the DCI represents a quantity of pieces of DCI including the DCI and sorted ahead of the DCI when the DCI is used as the last piece of DCI in a current sorting manner. Specifically, a DCI sequence or a DAI indication sequence is jointly determined based on a PDCCH monitoring occasion, a carrier number, and the first parameter.

Optionally, the target DCI is further used to indicate a quantity of HARQ-ACK bits carried on a PUCCH. Specifically, the DAI value indicated by using the target DCI is used to determine the quantity of HARQ-ACK bits.

Optionally, the DCI sequence or the DAI indication sequence is determined first based on the carrier number, then based on a PDCCH monitoring occasion sequence, and then based on the index values of the first parameter; is determined first based on a PDCCH monitoring occasion sequence, then based on the carrier number, and then based on the index values of the first parameter; is determined first based on the index values of the first parameter, then based on a PDCCH monitoring occasion sequence, and then based on the carrier number; or first based on the carrier number, then based on the index values of the first parameter, and then based on a PDCCH monitoring occasion sequence.

It should be understood that the quantity of pieces of DCI herein includes a quantity of all delivered DCI on the at least one PDCCH monitoring occasion, namely, a quantity of all PDSCHs, namely, a total quantity of HARQ-ACK bits corresponding to the at least one PDCCH monitoring occasion.

Optionally, the DAI value indicated by using the DCI represents a quantity of all pieces of DCI sorted ahead of the DCI when the DCI is used as the current last piece of DCI in a control-resource set or a control-resource set group.

With reference to the first aspect, in a possible implementation, the determining, based on a DAI value indicated by using the target DCI, a quantity of the HARQ-ACK bits carried on the same PUCCH resource includes: adding 1 to a first buffer value when the DAI value indicated by using the target DCI is less than a DAI value indicated by using second DCI, where the second DCI is on the first PDCCH monitoring occasion, and an index value that corresponds to the second DCI and that is of the first parameter is different from the index value that corresponds to the target DCI and that is of the first parameter; and determining, based on a sum of the first buffer value to which 1 is added and the DAI value indicated by using the target DCI, the quantity of the HARQ-ACK bits carried on the same PUCCH resource.

The DAI value is a value corresponding to a bit value of a DAI field in the DCI.

Optionally, the DAI value is any integer from 1 to 4.

Optionally, the first DCI and the second DCI are on a same PDCCH monitoring occasion.

Optionally, the first DCI and the second DCI are on a same carrier.

Optionally, the first DCI is determined as the target DCI by using the index value that corresponds to the second DCI and that is of the first parameter and the index values of the first parameter that correspond to the first DCI, and an interpretation of a DAI in the second DCI and an interpretation of a DAI in the first DCI are determined based on this.

Optionally, a sequence of the second DCI and the first DCI is determined by using the index value that corresponds to the second DCI and that is of the first parameter and the index values of the first parameter that correspond to the first DCI, and an interpretation of a DAI in the second DCI and an interpretation of a DAI in the first DCI are determined based on this. If the first DCI is sorted after the second DCI, the terminal device determines the quantity of the HARQ-ACK bits on the PUCCH resource based on the DAI in the first DCI. In addition, the terminal device also determines, based on the index value of the PUCCH resource indicated by using the first DCI, the PUCCH resource carrying the HARQ-ACK.

Optionally, when a DAI value indicated by using the first DCI is less than a DAI value indicated by using the second DCI, the terminal device needs to add 1 to the first buffer value, and determines, based on the sum of the first buffer value to which 1 is added and the DAI value indicated by using the target DCI, the quantity of the HARQ-ACK bits carried on the same PUCCH resource, to avoid a case in which when the network device sends more than four pieces of DCI and a value of a DAI indication indicated by using the DCI does not exceed 4, the terminal device cannot determine an actual quantity of HARQ-ACK bits based on the DAI value indicated by using the DCI.

With reference to the first aspect, in a possible implementation, the DCI monitored on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

With reference to the first aspect, in a possible implementation, at least one of the plurality of carriers includes at least two first parameters.

According to a second aspect, a method for determining a hybrid automatic repeat request-acknowledgment (HARQ-ACK) resource is provided, and includes: sending downlink control information (DCI) on at least one physical downlink control channel (PDCCH) monitoring occasion, where HARQ-ACK feedback bits scheduled by using the DCI are carried on a same PUCCH resource; and determining target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

The target DCI is determined by using an index value that corresponds to DCI monitored on the last PDCCH monitoring occasion in the at least one PDCCH monitoring occasion and that is of a control-resource set or an index value that corresponds to the DCI and that is of a control-resource set group, so that a network device can control a PUCCH resource used for a HARQ-ACK feedback of a terminal device, to improve uplink transmission performance and avoid interference in uplink transmission.

With reference to the second aspect, in a possible implementation, HARQ-ACK feedback information is received. The HARQ-ACK feedback bits are carried on the same PUCCH resource. The PUCCH resource carrying the HARQ-ACK feedback information is determined by the terminal device based on the index values of the first parameter that correspond to first DCI on the first PDCCH monitoring occasion. The first PDCCH monitoring occasion is the last PDCCH monitoring occasion in the at least one PDCCH monitoring occasion. The first parameter is a control-resource set or a control-resource set group.

With reference to the second aspect, in a possible implementation, an index value that corresponds to the target DCI and that is of the first parameter is the largest one or the smallest one of the index values of the first parameter that correspond to the first DCI.

With reference to the second aspect, in a possible implementation, the DCI sent on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

With reference to the second aspect, in a possible implementation, at least one of the plurality of carriers includes at least two first parameters.

With reference to the second aspect, in a possible implementation, the downlink control information (DCI) is sent on the at least one PDCCH monitoring occasion. The HARQ-ACK feedback bits scheduled by using the DCI are carried on the same PUCCH resource. The DCI includes the piece of target DCI. The target DCI is used to indicate the PUCCH resource. The target DCI is on the first PDCCH monitoring occasion. The first PDCCH monitoring occasion is the last PDCCH monitoring occasion in the at least one PDCCH monitoring occasion. The target DCI corresponds to a first index value of the first parameter. The first parameter is the control-resource set or the control-resource set group.

According to a third aspect, a method for determining a hybrid automatic repeat request-acknowledgment (HARQ-ACK) resource is provided, and includes: determining at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource; and determining a first PDCCH monitoring occasion, where the first PDCCH monitoring occasion is the last PDCCH monitoring occasion in the at least one PDCCH monitoring occasion, and each piece of DCI monitored on the first PDCCH monitoring occasion is used to indicate the PUCCH resource.

Optionally, a terminal device determines the PUCCH resource based on any DCI on the first PDCCH monitoring occasion.

Optionally, the terminal device determines the PUCCH resource based on any DCI on a first carrier on the first PDCCH monitoring occasion, where the first carrier is a carrier having a largest number or a smallest number on the first PDCCH monitoring occasion.

The PUCCH resource carrying the HARQ-ACK feedback bits scheduled by using the DCI is determined by using the DCI monitored on the last PDCCH monitoring occasion in the at least one PDCCH monitoring occasion, so that a network device can control a PUCCH resource used for a HARQ-ACK feedback of the terminal device, to improve uplink resource transmission performance and avoid interference in uplink transmission.

With reference to the third aspect, in a possible implementation, PUCCH resources indicated by using DCI monitored on a second PDCCH monitoring occasion are the same, and the second PDCCH monitoring occasion is any one of the at least one PDCCH monitoring occasion.

PUCCH resources indicated by using all DCI monitored on any one of the at least one determined PDCCH monitoring occasion are limited to be the same, so that the network device can control the PUCCH resource used for the HARQ-ACK feedback of the terminal device, to improve uplink resource transmission performance and avoid interference in uplink transmission.

With reference to the third aspect, in a possible implementation, PUCCH resources indicated by using DCI monitored on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

PUCCH resources indicated by using all DCI monitored on a same carrier on any one of the at least one determined PDCCH monitoring occasion are limited to be the same, so that the network device can control the PUCCH resource used for the HARQ-ACK feedback of the terminal device, to improve uplink resource transmission performance and avoid interference in uplink transmission.

According to a fourth aspect, a method for determining a hybrid automatic repeat request-acknowledgment (HARQ-ACK) resource is provided, and includes: sending downlink control information (DCI) on at least one physical downlink control channel (PDCCH) monitoring occasion, where HARQ-ACK feedback bits scheduled by using the DCI are carried on a same physical uplink control channel (PUCCH) resource, where each piece of DCI on a first PDCCH monitoring occasion is used to indicate the PUCCH resource, and the first PDCCH monitoring occasion is the last PDCCH monitoring occasion in the at least one PDCCH monitoring occasion; and receiving the HARQ-ACK feedback bits on the PUCCH resource.

The HARQ-ACK feedback bits are received, and the PUCCH resource carrying the HARQ-ACK feedback bits is determined by a terminal device based on the DCI monitored on the last PDCCH monitoring occasion in the at least one determined PDCCH monitoring occasion, so that a network device can control a PUCCH resource used for a HARQ-ACK feedback of the terminal device, to improve uplink resource transmission performance, and avoid interference in uplink transmission.

With reference to the fourth aspect, in a possible implementation, PUCCH resources indicated by using DCI sent on a second PDCCH monitoring occasion are the same, and the second PDCCH monitoring occasion is any one of the at least one PDCCH monitoring occasion. PUCCH resources indicated by using all DCI monitored on any one of the at least one determined PDCCH monitoring occasion are limited to be the same, so that the network device can control the PUCCH resource used for the HARQ-ACK feedback of the terminal device, to improve uplink resource transmission performance and avoid interference in uplink transmission.

With reference to the fourth aspect, in a possible implementation, PUCCH resources indicated by using DCI sent on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion. PUCCH resources indicated by using all DCI monitored on any one of the at least one determined PDCCH monitoring occasion are limited to be the same, so that the network device can control the PUCCH resource used for the HARQ-ACK feedback of the terminal device, to improve uplink resource transmission performance and avoid interference in uplink transmission.

According to a fifth aspect, an apparatus for determining a hybrid automatic repeat request-acknowledgment (HARQ-ACK) resource is provided, and includes: a processing module, configured to determine at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource, where the processing module is further configured to determine target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

With reference to the fifth aspect, in a possible implementation, an index value that corresponds to the target DCI and that is of the first parameter is the largest one or the smallest one of the index values of the first parameter that correspond to the first DCI.

With reference to the fifth aspect, in a possible implementation, the processing module is further configured to:

determine, based on a DAI value indicated by using the target DCI, a quantity of the HARQ-ACK bits carried on the same PUCCH resource.

With reference to the fifth aspect, in a possible implementation, 1 is added to a first buffer value when the DAI value indicated by using the target DCI is less than a DAI value indicated by using second DCI, where the second DCI is on the first PDCCH monitoring occasion, and an index value that corresponds to the second DCI and that is of the first parameter is different from the index value that corresponds to the target DCI and that is of the first parameter; the quantity of the HARQ-ACK bits carried on the PUCCH resource is determined based on a sum of the first buffer value to which 1 is added and the DAI value indicated by using the target DCI.

With reference to the fifth aspect, in a possible implementation, the DCI monitored on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

With reference to the fifth aspect, in a possible implementation, at least one of the plurality of carriers includes at least two first parameters.

According to a sixth aspect, an apparatus for determining a hybrid automatic repeat request-acknowledgment (HARQ-ACK) resource is provided, and includes: a transceiver module, configured to send downlink control information (DCI) on at least one physical downlink control channel (PDCCH) monitoring occasion, where HARQ-ACK feedback bits scheduled by using the DCI are carried on a same physical uplink control channel (PUCCH) resource; and a processing module, further configured to determine target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

With reference to the sixth aspect, in a possible implementation, an index value that corresponds to the target DCI and that is of the first parameter is the largest one or the smallest one of the index values of the first parameter that correspond to the first DCI.

With reference to the sixth aspect, in a possible implementation, the DCI sent on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

With reference to the sixth aspect, in a possible implementation, at least one of the plurality of carriers includes at least two first parameters.

According to a seventh aspect, an apparatus for determining a hybrid automatic repeat request-acknowledgment (HARQ-ACK) resource is provided, and includes: a processing module, configured to determine at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource, where the processing module is further configured to determine a first PDCCH monitoring occasion, where the first PDCCH monitoring occasion is the last PDCCH monitoring occasion in the at least one PDCCH monitoring occasion, and each piece of DCI monitored on the first PDCCH monitoring occasion is used to indicate the PUCCH resource.

With reference to the seventh aspect, in a possible implementation, PUCCH resources indicated by using DCI monitored on a second PDCCH monitoring occasion are the same, and the second PDCCH monitoring occasion is any one of the at least one PDCCH monitoring occasion.

With reference to the seventh aspect, in a possible implementation, PUCCH resources indicated by using DCI monitored on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

According to an eighth aspect, an apparatus for determining a hybrid automatic repeat request-acknowledgment (HARQ-ACK) resource is provided, and includes: a transceiver module, configured to send downlink control information (DCI) on at least one physical downlink control channel (PDCCH) monitoring occasion, where HARQ-ACK feedback bits scheduled by using the DCI are carried on a same PUCCH resource, where each piece of DCI on a first PDCCH monitoring occasion is used to indicate the PUCCH resource, and the first PDCCH monitoring occasion is the last PDCCH monitoring occasion in the at least one PDCCH monitoring occasion; the transceiver module is further configured to receive the HARQ-ACK feedback bits on the PUCCH resource.

With reference to the eighth aspect, in a possible implementation, PUCCH resources indicated by using DCI sent on a second PDCCH monitoring occasion are the same, and the second PDCCH monitoring occasion is any one of the at least one PDCCH monitoring occasion.

With reference to the eighth aspect, in a possible implementation, PUCCH resources indicated by using DCI sent on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

According to a ninth aspect, a communications device is provided, and includes a processor, a transceiver, and a memory. The memory is configured to store a computer program. The transceiver is configured to perform a sending and receiving step in the method for determining a hybrid automatic repeat request-acknowledgment (HARQ-ACK) resource in any possible implementation of the first aspect to the fourth aspect. The processor is configured to invoke the computer program from the memory and run the computer program, so that the data transmission device performs the method for determining a hybrid automatic repeat request-acknowledgment (HARQ-ACK) resource in any possible implementation of the first aspect to the fourth aspect.

Optionally, there are one or more processors and one or more memories.

Optionally, the memory may be integrated with the processor, or the memory and the processor may be separately disposed.

Optionally, the transceiver includes a transmitter (transmitter) and a receiver (receiver).

According to a tenth aspect, a computer-readable storage medium is provided. The computer-readable medium stores a computer program. When the computer program is run on a computer, the computer is enabled to perform the method according to either of the first aspect and/or the third aspect.

According to an eleventh aspect, a computer-readable storage medium is provided. The computer-readable medium stores a computer program. When the computer program is run on a computer, the computer is enabled to perform the method according to either of the second aspect and/or the fourth aspect.

According to a twelfth aspect, a communications system is provided, and includes the apparatus for determining a hybrid automatic repeat request-acknowledgment (HARQ-ACK) resource according to either of the fifth aspect and the seventh aspect or the apparatus for determining a hybrid automatic repeat request-acknowledgment (HARQ-ACK) resource according to either of the sixth aspect and the eighth aspect.

According to a thirteenth aspect, a chip system is provided, and includes a memory and a processor. The memory is configured to store a computer program. The processor is configured to invoke the computer program from the memory and run the computer program, so that a communications device on which the chip system is installed performs the method in any possible implementation of the first aspect to the fourth aspect.

BRIEF DESCRIPTION OF DRAWINGS

FIG. 3 is a schematic flowchart of a method 300 for determining a HARQ-ACK resource according to an embodiment of this application;

FIG. 8 is a schematic flowchart of another method 400 for determining a HARQ-ACK resource according to an embodiment of this application;

FIG. 9 is a schematic diagram of an apparatus 900 for determining a hybrid automatic repeat request-acknowledgment (HARQ-ACK) resource according to this application;

DESCRIPTION OF EMBODIMENTS

Figures 1, 2A:
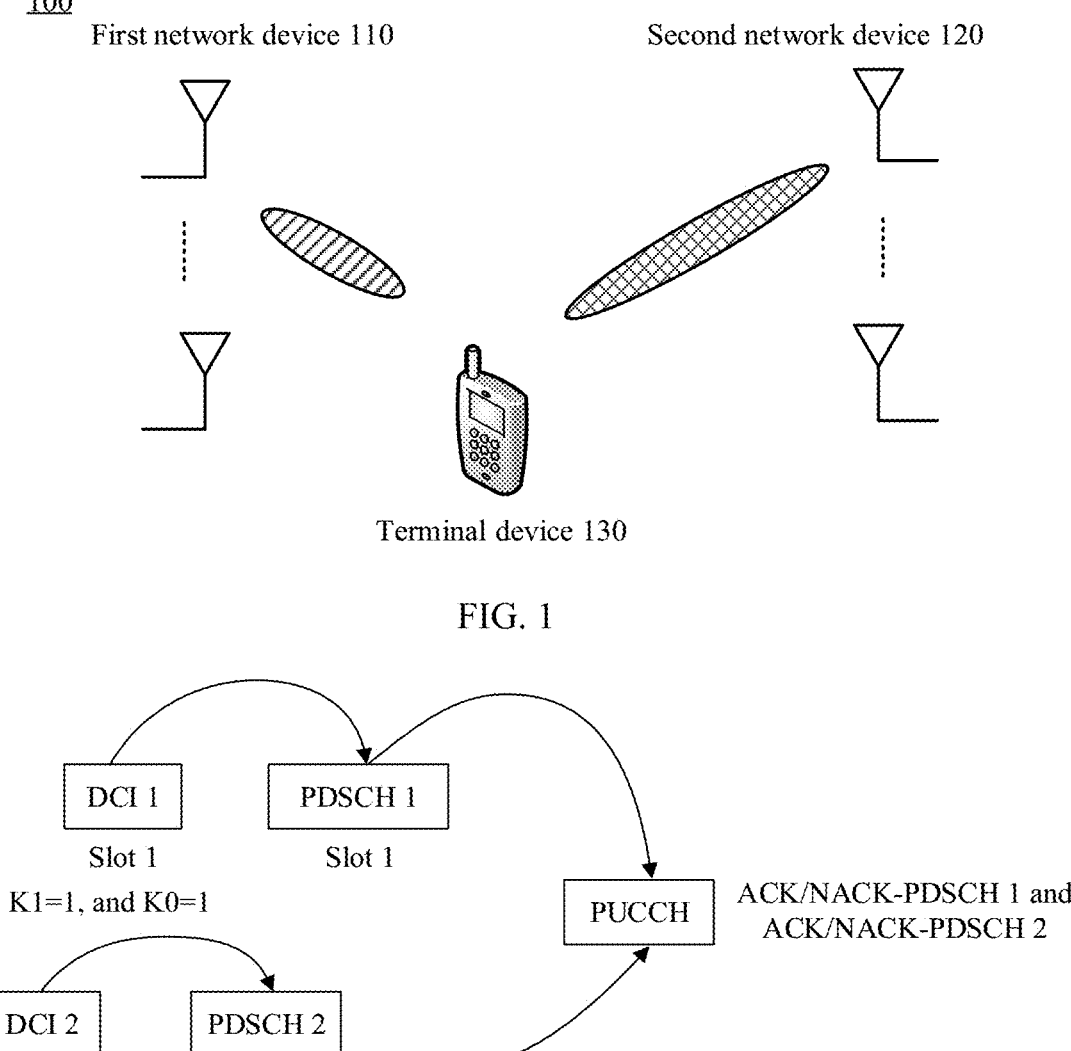
FIG. 1 is a schematic diagram of a wireless communications system 100 applicable to an embodiment of this application.
FIG. 2(a) is a schematic diagram of an existing HARQ-ACK time domain location indication.

The following describes technical solutions in this application with reference to accompanying drawings.

The technical solutions in the embodiments of this application may be applied to various communications systems such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network or a terminal device in a future evolved public land mobile network (public land mobile network, PLMN), or the like. This is not limited in the embodiments of this application.

A network device in the embodiments of this application may be a device configured to communicate with the terminal device. It should be understood that the network device in the wireless communications system may be any device that has a wireless transceiver function. The device includes but is not limited to an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a home evolved NodeB or a Home NodeB, HNB), a baseband unit (BaseBand Unit, BBU), an access point (Access Point, AP) in a wireless fidelity (Wireless Fidelity, Wi-Fi) system, a wireless relay node, a wireless backhaul node, a transmission point (transmission point, TP), a transmission reception point (transmission and reception point, TRP), or the like, may alternatively be a gNB or a transmission point (a TRP or a TP) in a 5G system such as an NR system or one antenna panel or one group (including a plurality of antenna panels) of antenna panels of a base station in a 5G system, or may be a network node that is included in a gNB or a transmission point, for example, a baseband unit (BBU) or a distributed unit (distributed unit, DU).

In some deployments, the gNB may include a centralized unit (centralized unit, CU) and the DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (radio access network, RAN), or may be a network device in a core network (core network, CN). This is not limited in this application.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process). For example, the operating system is a Linux operating system, a Unix operating system, an Android operating system, an iOS operating system, a Windows operating system, or the like. The application layer includes applications such as a browser, an address book, word processing software, and instant communications software. In addition, a specific structure of an execution body of a method provided in the embodiments of this application is not particularly limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or another machine-readable medium that are configured to store information. The term "machine-readable medium" may include but is not limited to a radio channel, and various other media that can store, include, and/or carry an instruction and/or data.

FIG. 1 shows a wireless communications system 100 applicable to an embodiment of this application. The wireless communications system 100 may include at least one network device, for example, a first network device 110 and a second network device 120 shown in FIG. 1. Both the first network device 110 and the second network device 120 may communicate with a terminal device 130 through a wireless air interface. The first network device 110 and the second network device 120 may provide communication coverage for a specific geographical area, and may communicate with a terminal device located in the coverage area.

The wireless communications system 100 further includes one or more terminal devices (user equipment, UE) 130 located in the coverage of the first network device 110 and the second network device 120. The terminal device 130 may be mobile or fixed. The terminal device 130 may communicate with one or more core networks (core network) over a radio access network (radio access network, RAN).

The wireless communications system 100 may support CoMP transmission. To be specific, a plurality of cells or a plurality of transmission points (serving transmission reception point, serving TRP) may coordinate to send data to a same terminal device on a same time-frequency resource set, send data to a same terminal device on partially overlapping time-frequency resource sets, or send data to a same terminal device on different time-frequency resource sets. The plurality of cells may be served by a same network device or different network devices, and may be selected based on a channel gain or a path loss, received signal strength, a received signal instruction, or the like.

The terminal device 130 in the wireless communications system 100 may support multipoint transmission. To be specific, the terminal device 130 may communicate with the first network device 110, or may communicate with the second network device 120. The first network device 110 may be used as a serving network device. The serving network device is a network device that provides services such as radio resource control (radio resource control, RRC) connection, non-access stratum (non-access stratum, NAS) mobility management, and security input for the terminal device by using a wireless air interface protocol.

Optionally, the first network device 110 may be a serving network device, and the second network device 120 may be a coordinated network device. Alternatively, the first network device 110 may be a coordinated network device, and the second network device 120 is a serving network device. The serving network device may send control signaling to the terminal device, and the coordinated network device may send data to the terminal device. Alternatively, the serving network device may send control signaling to the terminal device, and the serving network device and the coordinated network device may both send data to the terminal device. Alternatively, the serving network device and the coordinated network device may both send control signaling to the terminal device, and the serving network device and the coordinated network device may both send data to the terminal device. This is not particularly limited in this embodiment of this application.

For example, the first network device 110 is a serving network device, and the second network device 120 is a coordinated network device. There may be one or more second network devices 120. In addition, the second network device 120 and the first network device 110 are network devices satisfying different quasi co-locations (quasi-co-location, QCL). That antenna ports are QCLed is defined as that signals sent from QCLed antenna ports may undergo same large-scale fading. The large-scale fading includes a delay spread, a Doppler spread, a Doppler frequency shift, an average channel gain, and an average delay.

It may be understood that both the first network device 110 and the second network device 120 may be serving network devices. For example, in a non-cell (non-cell) scenario or in a multi-cell scenario, both the first network device 110 and the second network device 120 are serving network devices in respective cells.

It should be further noted that this embodiment of this application is also applicable to a same network device having non-QCLed antenna ports. To be specific, different antenna panels may be configured for the network device. Antenna ports that belong to the different antenna panels in the same network device may be non-QCLed, and cell-specific reference signal (cell-specific reference signal, CRS) resource configurations corresponding to the antenna ports may also be different.

For ease of understanding of the embodiments of this application, before a data transmission method in the embodiments of this application is described, several basic concepts and mapping relationships from a codeword to a layer and from a layer to an antenna port are first briefly described.

1. Time-Frequency Resource Set

In a new radio access technology (new radio access technology, NR) system of the 3rd generation partnership project (3rd Generation Partnership Project, 3GPP), a downlink resource of the system is divided into a plurality of orthogonal frequency division multiplexing (orthogonal frequency division multiple, OFDM) symbols in terms of time, and is divided into several subcarriers in terms of frequency.

A PDCCH in a downlink usually occupies the first two or first three OFDM symbols in a subframe. The PDCCH is used to carry downlink control information (downlink control information, DCI).

DCI sent by a network device to a terminal device carries resource allocation control information specific to the terminal device and control information specific to the terminal device or other control information shared in a cell. A physical uplink shared channel (physical uplink shared channel, PUSCH) in an uplink of the system is used to carry uplink transmitted data, and usually generates a frequency domain signal through discrete Fourier transform spread orthogonal frequency division multiplexing (discrete Fourier transform spread orthogonal frequency division multiple, DFT-S-OFDM). Generally, a slot (slot) usually includes 14-OFDM symbols. A size of a physical resource block (physical resource block, PRB) is further defined in the system. The PRB includes 12-subcarriers in frequency domain. A subcarrier in an OFDM symbol is referred to as a resource element (resource element, RE). Specifically, in this application, the PRB may be referred to as a resource block (resource block, RB).

2. Indication Mechanism for a Time Domain Resource of a PDSCH

Because a data bit on which modulation and coding and a layer mapping procedure are performed is mapped to an RE, the PDSCH includes an RE used to carry data. The network device indicates a time domain location of the PDSCH by using signaling. An existing indication mechanism is as follows: There is a time domain location indication field (SLIV) in DCI, each bit value in the field corresponds to each row of information (R) in the following Table 1, and a set including each row of time domain location information R is denoted as an R set. For example, the field includes four bits, and indication bits of 0111 corresponds to an eighth row of information. Each row of information includes four columns:

(1) The first column indicates index values of R.

(2) The second column indicates PDSCH mapping types. A data start location of a mapping type A is the first OFDM symbol in a slot other than an OFDM symbol of a PDCCH. For example, if a quantity of OFDM symbols of the PDCCH is 2, the start location of the PDSCH is 2 (where an OFDM symbol is usually numbered from 0). A data start location of a mapping type B is any OFDM symbol location in a slot.

(3) The third column indicates a slot offset K0 of the PDSCH after a PDCCH for scheduling the PDSCH.

(4) The fourth column indicates an OFDM symbol start location S of the PDSCH in a corresponding slot.

(5) The fifth column indicates an OFDM symbol length L of the PDSCH in the corresponding slot.

TABLE 1

| R index value (Row index) | PDSCH mapping relationship type (mapping type) | K0 | S | L |
|---|---|---|---|---|
| 1 | Type A | 0 | 2 | 12 |
| 2 | Type A | 0 | 2 | 10 |
| 3 | Type A | 0 | 2 | 9 |
| 4 | Type A | 0 | 2 | 7 |
| 5 | Type A | 0 | 2 | 5 |
| 6 | Type B | 0 | 9 | 4 |
| 7 | Type B | 0 | 4 | 4 |
| 8 | Type B | 0 | 5 | 7 |
| 9 | Type B | 0 | 5 | 2 |
| 10 | Type B | 0 | 9 | 2 |
| 11 | Type B | 0 | 12 | 2 |
| 12 | Type A | 0 | 1 | 13 |
| 13 | Type A | 0 | 1 | 6 |
| 14 | Type A | 0 | 2 | 4 |
| 15 | Type B | 0 | 4 | 7 |
| 16 | Type B | 0 | 8 | 4 |

The terminal device may determine, based on a row of information in Table 1, the time domain resource occupied by the PDSCH.

3. Coordinated Multipoint Transmission/Reception Mechanism

In downlink transmission, terminal devices may simultaneously communicate with a plurality of network devices. To be specific, the terminal devices simultaneously receive data from the plurality of network devices. The transmission mode is referred to as coordinated multipoint transmission/reception CoMP. The plurality of network devices constitute a coordinating cluster, to simultaneously communicate with the terminal devices. The network devices in the coordinating cluster may be separately connected to different control nodes. The control nodes may exchange information with each other, for example, exchange scheduling policy information, to achieve an objective of coordinated transmission/reception. Alternatively, all the network devices in the coordinating cluster are connected to a same control node. The control node receives channel state information (for example, channel state information (channel state information, CSI) or a reference signal received power (reference signal received power, RSRP) that is reported by the terminal devices and that is collected by the network devices in the coordinating cluster, performs unified scheduling on the terminal devices in the coordinating cluster based on the channel state information of all the terminal devices in the coordinating cluster, and then exchanges a scheduling policy with the network devices connected to the control node. Then, each network device separately notifies a respective terminal device of the scheduling policy by using DCI signaling carried on a PDCCH.

Based on an information exchange delay between the network devices, CoMP transmission may be classified into ideal backhaul (ideal backhaul, IB) and non-ideal backhaul (non-ideal backhaul, NIB).

For the IB, an exchange delay can be ignored because an inter-site distance between the network devices or between the network devices and the central node is short, or the network devices or the network devices and the central node are connected through optical fibers with relatively low transmission losses.

The foregoing transmission mechanism is specifically reflected in an existing protocol as follows:

(1) That two PDSCHs are from two TRPs as reflected as follows: The PDSCHs of the two TRPs correspond to different QCL information. The QCL information is used to indicate a QCL relationship between two types of reference signals or a reference signal and a channel. A target reference signal may be usually a demodulation reference signal (demodulation reference signal, DMRS), a channel state information reference signal (channel state information reference signal, CSI-RS), or the like. A referenced reference signal or a source reference signal may be usually a channel state information reference signal (channel state information reference signal, CSI-RS), a tracking reference signal (tracking reference signal, TRS), a synchronization signal/physical broadcast channel block (synchronous signal/PBCH block, SSB), or the like.

(2) That the two TRPs separately send respective DCI to schedule the respective PDSCHs is reflected as follows: One or more control-resource sets (CORESET) are configured for each of the two TRPs. The control-resource set is used to carry DCI. In this case, monitoring the DCI on different control-resource sets means that DCI indicated by different TRPs is received.

(3) The PDSCHs scheduled by the two TRPs are located in a same frequency band. For example, in a same component carrier (Component Carrier, CC) or a same bandwidth part (Bandwidth Part, BWP), the control-resource sets of the two TRPs are also located in a same frequency band.

4. HARQ-ACK Codebook Generation Mechanism

After delivering a PDSCH, the network device needs to obtain HARQ-ACK information that is of the PDSCH and that is fed back by UE, to learn of whether the PDSCH is correctly decoded. If the PDSCH is correctly decoded, the UE feeds back an acknowledgment (Acknowledgment, ACK); otherwise, the UE feeds back a negative acknowledgment (Negative Acknowledgment, NACK). The information usually corresponds to one bit. For example, when the bit is set to 0, it indicates the NACK; when the bit is set to 1, it indicates the ACK. Generally, N pieces of ACK/NACK information are fed back in a unified manner on N PDSCHs delivered by the network device. That is, each of the N pieces of HARQ-ACK information corresponds to at least one bit, and corresponds to a HARQ-ACK feedback of one PDSCH. "Fed back in a unified manner" means that the N pieces of ACK/NACK information are carried on one PUCCH resource in a joint coding manner. Therefore, in the prior art, how to determine HARQ-ACK feedbacks corresponding to which PDSCHs need to be fed back in a unified manner needs to be resolved. That is, for a PUCCH resource, a quantity of HARQ-ACK bits carried on the PUCCH resource needs to be determined.

(1) Semi-Persistent (Semi-Persistent) HARQ-ACK Codebook Generation Mechanism

The network device configures a K1 set by using higher layer signaling. The K1 set includes a plurality of values of K1. When the network device delivers DCI for scheduling a PDSCH, the DCI carries signaling to indicate to select a value of K1 from the K1 set. The value of K1 is defined as a slot interval from an end OFDM symbol location (which is determined based on a row indicated by using the DCI in Table 1) of the PDSCH scheduled by using the DCI to a HARQ-ACK feedback. In the prior art, a limitation is that only one PUCCH carrying a HARQ-ACK can be transmitted in one slot. Therefore, if slot locations that are of HARQ-ACK feedbacks and that are determined based on K0 and K1 that are indicated by using a plurality of pieces of DCI are a same slot, PDSCHs scheduled by using the plurality of pieces of DCI are transmitted on one PUCCH in the slot in a unified manner. As shown in FIG. 2(a), a K1 set configured by the network device by using higher layer signaling is {1, 2}, and it may be determined, based on K0=1 and K1=1 that are indicated by using DCI 1 and K0=1 and K1=2 that are indicated by using DCI 2, that HARQ-ACKs of a PDSCH 1 and a PDSCH 2 are fed back in a unified manner, to be specific, are carried on a same PUCCH resource.

In the prior art, a PDSCH occasion, namely, a location at which a PDSCH may be sent, is defined to determine a HARQ-ACK bit sequentially corresponding to each PDSCH occasion. In other words, a quantity of PDSCH occasions is a quantity of HARQ-ACK bits. In addition, an arrangement sequence of PDSCH occasions needs to be defined based on a preset rule, so that an arrangement sequence of HARQ-ACK bits corresponding to different PDSCHs is defined.

Figures 2B, 2C:
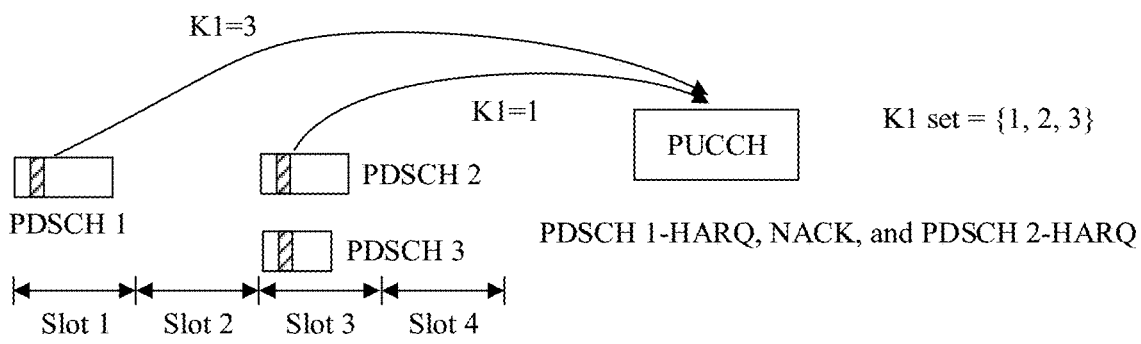
FIG. 2(b) is a schematic diagram of an existing HARQ-ACK feedback mechanism.
FIG. 2(c) is a schematic diagram of an existing dynamic HARQ-ACK feedback mechanism.

The PDSCH occasion is determined based on the R set and the K1 set that are configured by using higher layer signaling. Specifically, the UE first determines all candidate PDSCH occasions corresponding to one feedback moment. The candidate PDSCH occasions correspond to all rows in the R set corresponding to each value of K1. For example, as shown in FIG. 2(b), the K1 set includes three values, and the R set includes two Rs. In this case, a quantity of the candidate PDSCH occasions is 6. After the candidate PDSCH occasions are determined, the candidate PDSCH occasions are first arranged in descending order of values of K1. Then, whether there are overlapping PDSCH occasions corresponding to each value of K1 is determined based on r. A plurality of overlapping candidate PDSCH occasions are denoted as a same PDSCH occasion, and non-overlapping candidate PDSCH occasions are denoted as different PDSCH occasions. A manner of determining whether the candidate PDSCH occasions overlap is as follows: An end OFDM symbol location of each candidate PDSCH occasion is determined based on each row R corresponding to each value of K1, R corresponding to a foremost end OFDM symbol location is used as a reference, if a start OFDM symbol location corresponding to a remaining R is before the foremost end OFDM symbol location, it is considered as overlapping, and then R corresponding to a foremost end OFDM symbol location is selected from other non-overlapping candidate PDSCH occasions to finally complete the sorting. For example, when an R index value shown in the following Table 2 is 1, candidate PDSCH occasions corresponding to r=1 and 2 are denoted as different PDSCH occasions. When an index value shown in the following Table 3 is 2, candidate PDSCH occasions corresponding to r=1 and 2 are denoted as a same PDSCH occasion.

TABLE 2

| R index value 1 (Row index 1) | PDSCH mapping relationship type (mapping type) | K0 | S | L |
| --- | --- | --- | --- | --- |
| 1 | Type B | 0 | 3 | 2 |
| 2 | Type B | 0 | 8 | 4 |

TABLE 3

| R index value 2 (Row index 2) | PDSCH mapping relationship type (mapping type) | K0 | S | L |
| --- | --- | --- | --- | --- |
| 1 | Type B | 0 | 3 | 2 |
| 2 | Type B | 0 | 2 | 4 |

The quantity of HARQ-ACK bits is determined based on the determined quantity of PDSCH occasions, and arrangement of the HARQ-ACK bits is determined based on the determined sequence of the PDSCH occasions. As shown in FIG. 2(b) and Table 4, the K1 set is configured as {1, 2, 3}, and the R set includes two Rs. It is determined, according to the foregoing criterion, that both R=1 and R=2 corresponding to each value of K1 correspond to a PDSCH occasion. In this case, for a PUCCH 1 in a slot 4, there are three HARQ-ACK bits in total. A first HARQ-ACK bit corresponds to K1=3 and R=1/2, a second HARQ-ACK bit corresponds to K1=2 and R=1/2, and a third HARQ-ACK bit corresponds to K1=1 and R=1/2. When actual PDSCH scheduling shown in FIG. 2(b) occurs, the first HARQ-ACK bit corresponds to a HARQ-ACK feedback of a PDSCH 1, the second HARQ-ACK bit corresponds to a NACK (because there is no actual PDSCH scheduling on the PDSCH occasion), and the third HARQ-ACK bit corresponds to a HARQ-ACK feedback of a PDSCH 2 or a PDSCH 3 (where the PDSCH 2 and the PDSCH 3 are not scheduled simultaneously, and only one scheduling case can occur).

TABLE 4

| R index value 2 (Row index 2) | PDSCH mapping relationship type (mapping type) | K0 | S | L |
| --- | --- | --- | --- | --- |
| 1 | Type B | 0 | 3 | 4 |
| 2 | Type B | 0 | 3 | 10 |

(2) Dynamic (Dynamic) HARQ-ACK Codebook Mechanism

In a dynamic HARQ-ACK codebook, a quantity of HARQ-ACK bits is determined based on a quantity of pieces of actually sent DCI, and corresponding arrangement of HARQ-ACK bits is determined based on a DCI arrangement sequence. Specifically, the UE determines a HARQ- ACK feedback occasion based on K0 and K1 that are indicated by using a plurality of pieces of monitored DCI, to determine some DCI that belongs to a same HARQ-ACK feedback occasion (PUCCH). For example, in FIG. 2(c) below, K0 and K1 corresponding to four pieces of DCI indicate that corresponding HARQ-ACK feedbacks are located in a same slot. Therefore, the four pieces of DCI correspond to a same HARQ-ACK feedback occasion. That is, HARQ-ACK bits are jointly coded (which is also referred to as "fed back in a unified manner"). How to arrange the plurality of HARQ-ACK bits for joint coding needs to be further defined. In the foregoing mechanism, the DCI of the jointly coded HARQ-ACK has been specified. In this case, the monitored DCI may be sorted based on PDCCHs and carrier numbers that correspond to the monitored DCI. For example, in FIG. 2(c), the terminal device determines that two carriers, namely, a carrier 1 and a carrier 2 shown in FIG. 2(c) are configured on both two PDCCH monitoring occasions (a PDCCH monitoring occasion 1 and a PDCCH monitoring occasion 2 shown in FIG. 2(c)). A number of the carrier 1 is less than a number of the carrier 2, and a total of four pieces of DCI, namely, DCI 1, DCI 2, DCI 3, and DCI 4, are monitored on the PDCCH monitoring occasion 1 and the PDCCH monitoring occasion 2. Therefore, the four pieces of DCI are sorted in a chronological sequence of the PDCCH monitoring occasions and in an ascending sequence of the carrier numbers as follows: The DCI 1 is the first DCI, the DCI 2 is the second DCI, the DCI 3 is the third DCI, and the DCI 4 is the fourth DCI. The DCI carries a field for indicating a counter DCI quantity, where the field is referred to as a counter (counter) downlink assignment index (Downlink Assignment Indication, DAI). This field (2-bit) is used to indicate HARQ-ACK bit locations and a HARQ-ACK bit quantity that are of a PDSCH currently scheduled by using the DCI. HARQ-ACK bit locations corresponding to each PDSCH are determined based on a value of a DAI indicated by using DCI for scheduling the PDSCH, and implicitly indicate a counter quantity of current PDCCH monitoring occasions. A DAI value sequence is the same as the foregoing DCI sorting criterion. For example, as shown in FIG. 2(c), according to the foregoing rule definition, a DAI indicated by using the DCI 1 is equal to 1, a DAI indicated by using the DCI 2 is equal to 2, a DAI indicated by using the DCI 3 is equal to 3, and a DAI indicated by using the DCI 4 is equal to 4. When any one or more of the four pieces of DCI are not correctly monitored, for example, when the DCI 2 is not correctly monitored, a total quantity of HARQ-ACK bits is not affected. The UE may determine, based on the DCI 3, missing monitoring of the DCI 2, thereby feeding back a NACK at a corresponding HARQ-ACK location.

The foregoing semi-persistent and dynamic HARQ-ACK feedback mechanisms define a quantity of HARQ-ACK bits and a bit arrangement mechanism. Because each of a plurality of pieces of DCI for feeding back a HARQ-ACK in a unified manner has a field that can be used to indicate a PUCCH resource, and HARQ-ACK bits corresponding to the plurality of pieces of DCI are carried only on a same PUCCH, a corresponding PUCCH resource needs to be determined. For example, as shown in FIG. 2(c), the four pieces of DCI respectively indicate four PUCCH resources, and one PUCCH resource needs to be finally determined. In an existing mechanism, a definition is that a PUCCH resource indicated by using the last piece of DCI, namely, the DCI 4 in FIG. 2(c), through the sorting is used as an uplink resource for carrying a HARQ-ACK feedback.

If PDSCHs that can be scheduled by a plurality of coordinated TRPs, namely, PDSCHs scheduled by using DCI carried on different control-resource sets, feed back HARQ-ACKs on a same PUCCH, a corresponding protocol is reflected as follows: One PUCCH resource in one slot is used to carry HARQ-ACK bits corresponding to PDSCHs scheduled by using two TRPs. That is, the HARQ-ACK bits of the two TRPs are jointly arranged and coded in a unified manner. In addition, a plurality of pieces of DCI on a same carrier on a same PDCCH monitoring occasion are used to jointly schedule HARQ-ACK feedbacks.

According to a PDCCH monitoring occasion defined in the prior art, on one PDCCH monitoring occasion on a same carrier, DCI sent by two TRPs may be used to schedule to feed back HARQ-ACKs on a same PUCCH, and a same PDCCH monitoring occasion may correspond to two TRPs. Therefore, a same HARQ-ACK feedback occasion actually corresponds to two "last piece of DCI" (which are respectively carried in two different control-resource sets or control-resource set groups). In addition, the two pieces of DCI may be used to independently indicate a PUCCH resource. In this case, a conflict indication may occur in the PUCCH resource indication. Consequently, a PUCCH resource used for a HARQ-ACK feedback of the UE is not controlled by the network device.

A joint HARQ-ACK feedback mechanism is supported in a scenario in which a plurality of TRPs separately use respective control-resource sets or control-resource set groups to indicate DCI. In the feedback mechanism, a plurality of pieces of DCI on a same PDCCH monitoring occasion may be used to indicate different PUCCH resources. Therefore, when the UE selects a PUCCH resource, there is ambiguity. Consequently, the network device cannot control selection of the PUCCH resource, and a waste of the PUCCH resource is caused.

Therefore, there is an urgent need to provide a method that can improve a PUCCH resource.

For ease of understanding the embodiments of this application, the following descriptions are provided before the embodiments of this application are described.

First, in the embodiments of this application, the "indication" may include a direct indication and an indirect indication, or may include an explicit indication and an implicit indication. Information indicated by using a piece of information (for example, first indication information described below) is referred to as to-be-indicated information. In a specific implementation process, the to-be-indicated information is indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is known or agreed on in advance. For example, specific information may also be indicated by using a pre-agreed (for example, stipulated in a protocol) arrangement sequence of various pieces of information, to reduce indication overheads to some extent.

Second, in the embodiments shown below, "first", "second", and various ordinal numbers are merely used for distinguishing for ease of description, and are not used to limit the scope of the embodiments of this application. For example, "first", "second", and the various ordinal numbers are used to distinguish between different DCI.

Third, the "protocol" in the embodiments of this application may be a standard protocol in the communications field, for example, may include an LTE protocol, an NR protocol, and a related protocol applied to a future communications system. This is not limited in this application.

Fourth, "a plurality of" mentioned in the embodiments of this application means two or more.

The following describes the method provided in the embodiments of this application in detail with reference to the accompanying drawings.

FIG. 3 is a schematic flowchart of a method 300 for determining a HARQ-ACK resource according to an embodiment of this application from a perspective of interaction between a network device and a terminal device. As shown in FIG. 3, the method 300 may include step 310 to step 330. The following describes the steps in the method 300 in detail.

Step 310: The network device sends DCI to the terminal device on at least one PDCCH monitoring occasion, where HARQ-ACK feedback bits scheduled by using the DCI are carried on a same PUCCH resource. Correspondingly, the terminal device performs blind detection on the DCI.

Optionally, when the terminal device monitors a plurality of pieces of DCI, the plurality of pieces of DCI may be sent by one or more network devices. Specifically, the plurality of pieces of DCI may all be sent by a same network device. Alternatively, some of the plurality of pieces of DCI are sent by a same network device, and remaining DCI may be sent by different network devices. Alternatively, the plurality of pieces of DCI may all be sent by different network devices.

Specifically, the network device sends the downlink control information (DCI) on the at least one PDCCH monitoring occasion. The HARQ-ACK feedback bits scheduled by using the DCI are carried on the same PUCCH resource. The DCI includes a piece of target DCI. The target DCI is used to indicate the PUCCH resource. The target DCI is on a first PDCCH monitoring occasion. The first PDCCH monitoring occasion is the last PDCCH monitoring occasion in the at least one PDCCH monitoring occasion. The target DCI corresponds to a first index value of a first parameter. The first parameter is a control-resource set or a control-resource set group.

Step 320: The terminal device determines the at least one PDCCH monitoring occasion, where the HARQ-ACK feedback bits scheduled by using the DCI monitored on the at least one PDCCH monitoring occasion are carried on the same PUCCH resource.

It should be understood that, that the HARQ-ACK feedback bits scheduled by using the DCI monitored on the at least one PDCCH monitoring occasion are carried on the same PUCCH resource may be that time domain resource locations that are of HARQ-ACK feedbacks and that are indicated by using the DCI monitored on the at least one PDCCH monitoring occasion are the same. A time domain resource may be a slot (slot), a sub-slot (sub-slot), or an OFDM symbol group.

Optionally, the terminal device may determine the at least one PDCCH monitoring occasion based on time domain resource locations occupied by HARQ-ACK feedbacks and corresponding to DCI monitored on a plurality of PDCCH monitoring occasions.

Step 330: Determine the target DCI based on index values of the first parameter that correspond to first DCI, where the first DCI is on the first PDCCH monitoring occasion, the first PDCCH monitoring occasion is the last PDCCH monitoring occasion in the at least one PDCCH monitoring occasion, the first parameter is the control-resource set or the control-resource set group, and the target DCI is used to indicate the PUCCH resource.

Optionally, the terminal device may determine, based on a time domain resource location that is occupied by a PDSCH and that is indicated by using DCI and a HARQ-ACK feedback delay corresponding to the PDSCH, a time domain resource occupied by a HARQ-ACK, where the HARQ-ACK feedback delay is an interval from an end time domain location occupied by the PDSCH to a start time domain location occupied by the HARQ-ACK feedback.

Specifically, first, the terminal device sorts the at least one determined PDCCH monitoring occasion, to determine the first PDCCH monitoring occasion, then obtains the index values of the first parameter that correspond to the first DCI on the first PDCCH monitoring occasion, and finally determines the target DCI based on an arrangement sequence of PDCCH monitoring occasions and an arrangement sequence of carriers and based on the index values of the first parameter that correspond to the first DCI on the first PDCCH monitoring occasion.

Further, the terminal device may sort the at least one PDCCH monitoring occasion in the following two manners.

Manner A: The terminal device may sort the at least one PDCCH monitoring occasion based on time domain locations of the DCI monitored on the at least one PDCCH monitoring occasion. Specifically, the terminal device sorts the at least one PDCCH monitoring occasion based on a sequence of the time domain locations.

In this case, the last PDCCH monitoring occasion in the at least one PDCCH monitoring occasion is a PDCCH monitoring occasion having a largest number in time domain in the at least one PDCCH monitoring occasion.

Figure 4:
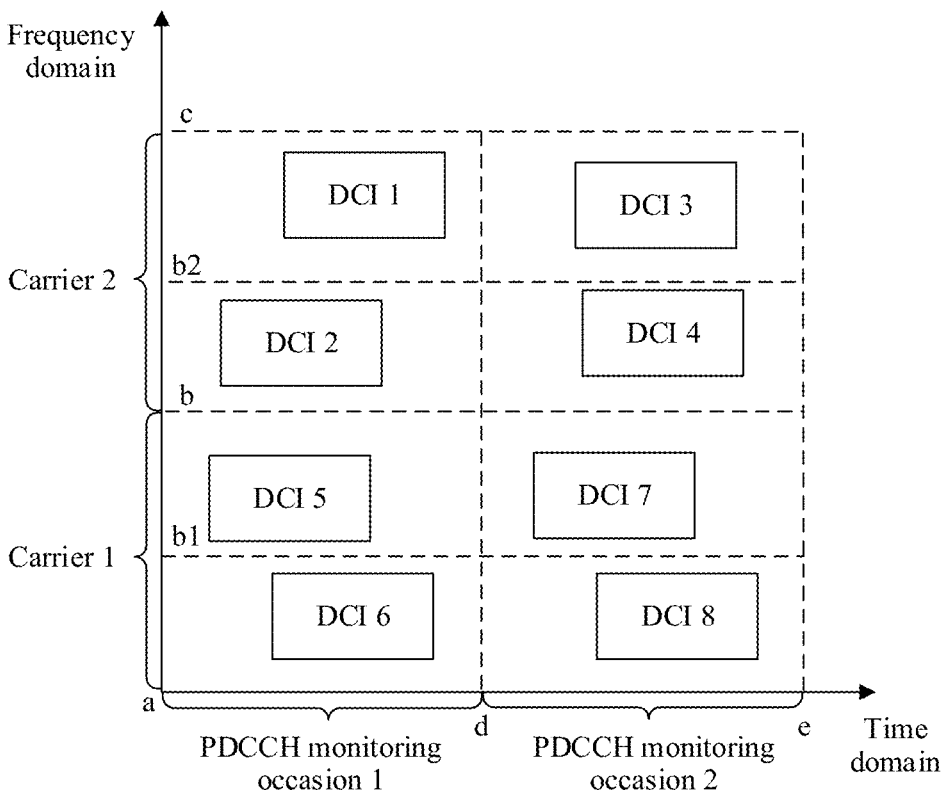
FIG. 4 is a schematic diagram of PDCCH monitoring occasions according to an embodiment of this application.

For example, FIG. 4 is a schematic diagram of PDCCH monitoring occasions according to an embodiment of this application. In FIG. 4, based on locations of PDCCH monitoring occasions in time domain, there may be two PDCCH monitoring occasions: a PDCCH monitoring occasion 1 (moment a to moment d) and a PDCCH monitoring occasion 2 (moment d to moment e). It may be learned, by sorting the PDCCH monitoring occasion 1 and the PDCCH monitoring occasion 2 based on the time domain locations of the PDCCH monitoring occasions, that the PDCCH monitoring occasion 1 is arranged before the PDCCH monitoring occasion 2. Therefore, the PDCCH monitoring occasion 2 is a PDCCH monitoring occasion with a larger time domain location number in the two PDCCH monitoring occasions, and the PDCCH monitoring occasion 1 is the last PDCCH monitoring occasion in the two PDCCH monitoring occasions.

Manner B: The terminal device may sort the at least one PDCCH monitoring occasion based on a sequence of start moments of search space of the DCI monitored on the at least one PDCCH monitoring occasion. A PDCCH monitoring occasion corresponding to an earlier start moment of search space has a smaller sequence number.

In this case, the last PDCCH monitoring occasion in the at least one PDCCH monitoring occasion is a PDCCH monitoring occasion that corresponds to a latest start moment of search space and that is in the at least one PDCCH monitoring occasion.

Optionally, the start moment of the search space is determined based on at least a PDCCH monitoring periodicity and a monitoring periodicity offset that are configured in the search space.

It should be understood that, that the first PDCCH monitoring occasion is the last PDCCH monitoring occasion in the at least one PDCCH monitoring occasion may be that the first PDCCH monitoring occasion is a PDCCH monitoring occasion having a largest number in the at least one PDCCH monitoring occasion. A number of the PDCCH monitoring occasion is determined according to a rule of sorting the at least one PDCCH monitoring occasion in the foregoing manner A or manner B, or may be determined according to another sorting rule.

For example, as shown in FIG. 4, a sequence of the PDCCH monitoring occasions is sequentially the PDCCH monitoring occasion 1 and the PDCCH monitoring occasion 2. Correspondingly, the PDCCH monitoring occasion 1 may be numbered ①, and the PDCCH monitoring occasion 2 may be numbered ②.

It should be understood that the first DCI is on the first PDCCH monitoring occasion is that the first DCI is DCI monitored on the first PDCCH monitoring occasion or that the first PDCCH monitoring occasion is determined based on a time domain location occupied by the first DCI.

Optionally, there may be one or more pieces of first DCI.

Optionally, the first DCI may be any DCI that is on a first carrier on the last PDCCH monitoring occasion in the at least one PDCCH monitoring occasion. The first carrier has a largest carrier number in the last PDCCH monitoring occasion, the first carrier has a smallest carrier number in the last PDCCH monitoring occasion, or the first carrier is any carrier in the last PDCCH monitoring occasion.

For example, as shown in FIG. 4, the first DCI may be any DCI on a carrier 1 on the last PDCCH monitoring occasion (the PDCCH monitoring occasion 2) in the at least one PDCCH monitoring occasion. To be specific, the first DCI may be either of DCI 7 and DCI 8. In this case, there are two pieces of first DCI. Alternatively, the first DCI may be any DCI on a carrier 2 on the last PDCCH monitoring occasion (the PDCCH monitoring occasion 2) in the at least one PDCCH monitoring occasion. To be specific, the first DCI may be either of DCI 3 and DCI 4. In this case, there are two pieces of first DCI.

Figure 5:
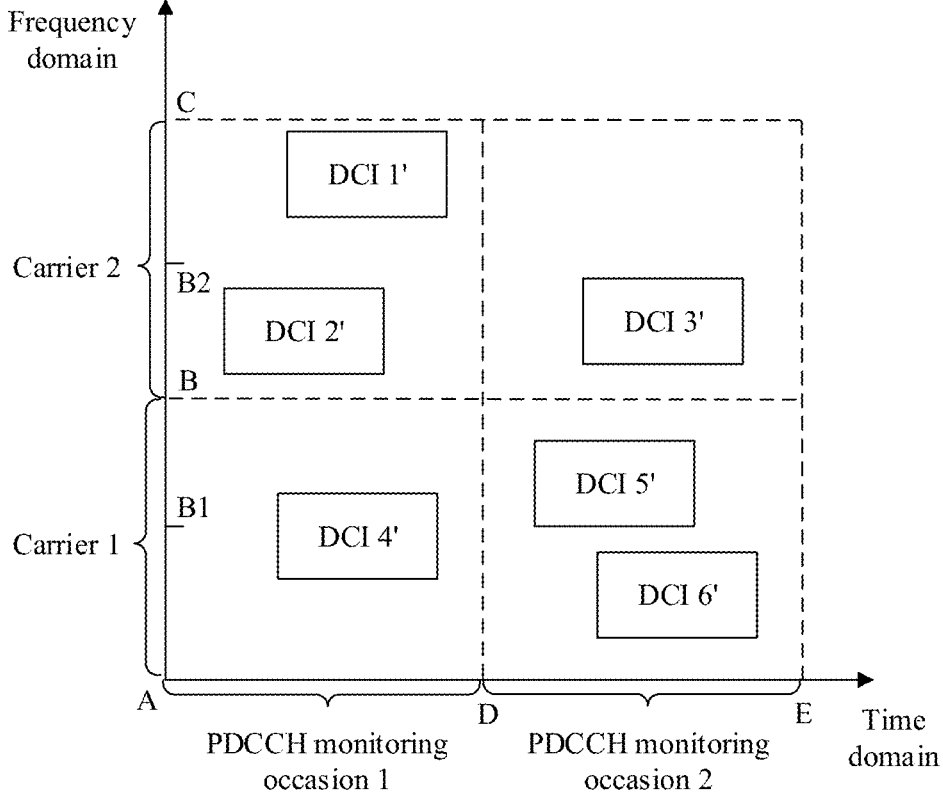
FIG. 5 is another schematic diagram of PDCCH monitoring occasions according to an embodiment of this application.

For another example, as shown in FIG. 5, the first DCI may be any DCI on a carrier 1 on the last PDCCH monitoring occasion (the PDCCH monitoring occasion 2) in the at least one PDCCH monitoring occasion. To be specific, the first DCI may be either of DCI 5' and DCI 6'. In this case, there are two pieces of first DCI. Alternatively, the first DCI may be any DCI on a carrier 2 on the last PDCCH monitoring occasion (the PDCCH monitoring occasion 2) in the at least one PDCCH monitoring occasion. To be specific, the first DCI may be DCI 3'. In this case, there is one piece of first DCI.

Figure 7:
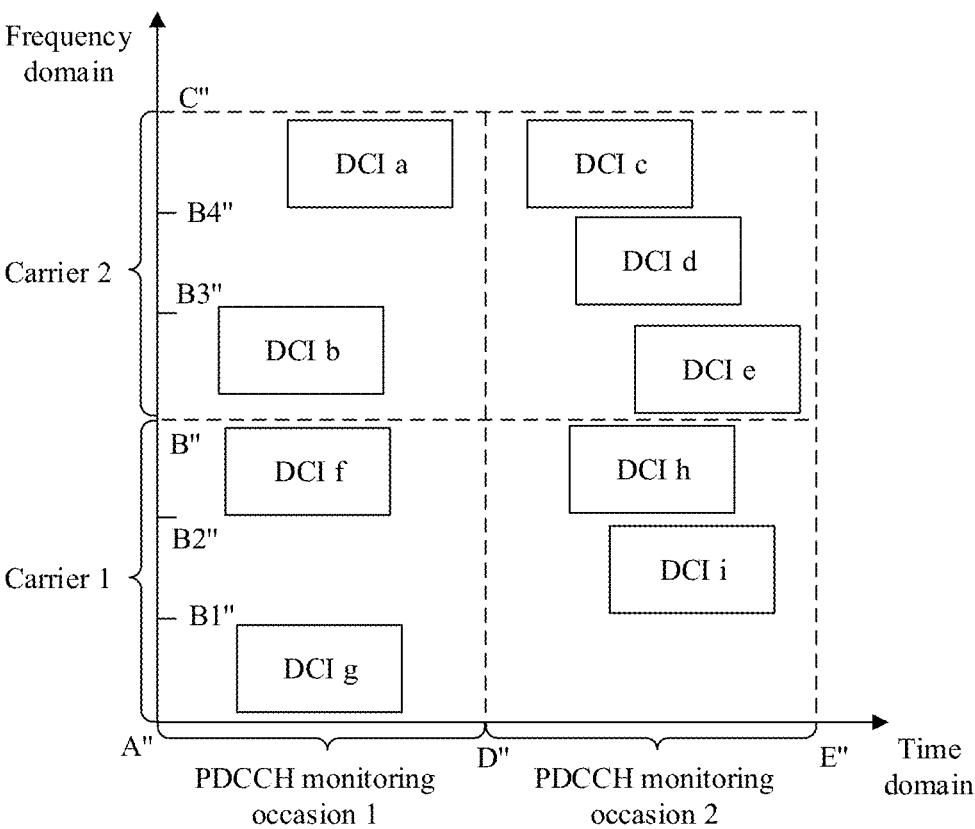
FIG. 7 is still another schematic diagram of PDCCH monitoring occasions according to an embodiment of this application.

For another example, as shown in FIG. 7, the first DCI may be any DCI on a carrier 1 on the last PDCCH monitoring occasion (the PDCCH monitoring occasion 2) in the at least one PDCCH monitoring occasion. To be specific, the first DCI may be either of DCI h and DCI i. In this case, there are two pieces of first DCI. Alternatively, the first DCI may be any DCI on a carrier 2 on the last PDCCH monitoring occasion (the PDCCH monitoring occasion 2) in the at least one PDCCH monitoring occasion. To be specific, the first DCI may be DCI c, DCI d, and DCI e. In this case, there are three pieces of first DCI.

Optionally, before determining the target DCI based on the index values of the first parameter that correspond to the first DCI, the terminal device needs to obtain the index values of the first parameter that correspond to the first DCI. An index value of the first parameter may be configured by using higher layer signaling.

Optionally, a value range of the index value of the first parameter on each carrier is the same. For example, in FIG.

7, an index value that corresponds to DCI g and the DCI i on the carrier 1 and that is of the first parameter is 0, an index value that corresponds to DCI f and the DCI h on the carrier 1 and that is of the first parameter is 1, an index value that corresponds to DCI a and the DCI c on the carrier 2 and that is of the first parameter is 0, and an index value that corresponds to DCI b, the DCI d, and the DCI e on the carrier 2 and that is of the first parameter is 1.

Optionally, the terminal device may determine, based on a system resource occupied by the monitored first DCI, the index values of the first parameter that correspond to the first DCI. For example, if index values of the first parameter that correspond to two pieces of first DCI are different, the two pieces of first DCI occupy different system resources. The system resource may be a time domain resource, a frequency domain resource, or a code domain resource. As shown in FIG. 4, an index value that corresponds to DCI 1 and the DCI 3 and that is of a control-resource set or a control-resource set group may be 0, and an index value that corresponds to DCI 2 and the DCI 4 and that is of the control-resource set or the control-resource set group may be 1. In this case, the terminal device may determine, by monitoring the DCI 1 to the DCI 4, index values that correspond to the four pieces of DCI and that are of the control-resource set or the control-resource set group. The target DCI may be determined by using information about the index values of the control-resource set or the control-resource set group. For example, if it is stipulated in a protocol that DCI corresponding to a largest index value of the first parameter on a carrier (for example, the carrier 2 in FIG. 4) having a largest carrier number on the first PDCCH monitoring occasion (for example, the PDCCH monitoring occasion 2 shown in FIG. 4) is used as the target DCI, the target DCI is the DCI 4 in FIG. 4.

Further, the terminal device may directly obtain, from the first DCI, the index values of the first parameter that correspond to the first DCI. Alternatively, the terminal device may determine, based on the monitored first DCI, the index values of the first parameter that correspond to the corresponding first DCI.

Specifically, the index value of the first parameter may be directly carried in the corresponding DCI. Specifically, a communications protocol may predefine a value range or a possible value of the index value of the first parameter. When sending DCI, the network device may directly carry value information of the index value by using the DCI. When the terminal device monitors the DCI, the terminal device directly obtains, by performing a decoding operation on the DCI, the index value that corresponds to the DCI and that is of the first parameter.

For example, as shown in FIG. 4, the network device may determine an index value of the first parameter in each piece of DCI based on a PDCCH monitoring occasion of DCI carrying the first parameter, a carrier number, and an index value of a control-resource set group. For example, on the occupied PDCCH monitoring occasion 2, the DCI 3 and the DCI 4 that occupy the carrier 2 respectively correspond to control-resource set groups 0 and 1, and the DCI 7 and the DCI 8 that occupy the carrier 1 respectively correspond to the control-resource set groups 0 and 1. In this case, an index value that is carried in each piece of DCI and that is of the first parameter may be determined based on the index values of the control-resource set groups and the carrier numbers that correspond to the four pieces of DCI.

For example, as shown in FIG. 5, the network device may determine an index value of the first parameter in each piece of DCI based on a PDCCH monitoring occasion of DCI carrying the first parameter, a carrier number, and an index value of a control-resource set group. For example, on the occupied PDCCH monitoring occasion 2, the DCI 3' that occupies the carrier 2 corresponds to the control-resource set group 1, and the DCI 5' and the DCI 6' that occupy the carrier 1 respectively correspond to the control-resource set groups 0 and 1. In this case, an index value that is carried in each piece of DCI and that is of the first parameter may be determined based on the index values of the control-resource set groups and the carrier numbers that correspond to the three pieces of DCI.

Figure 6:
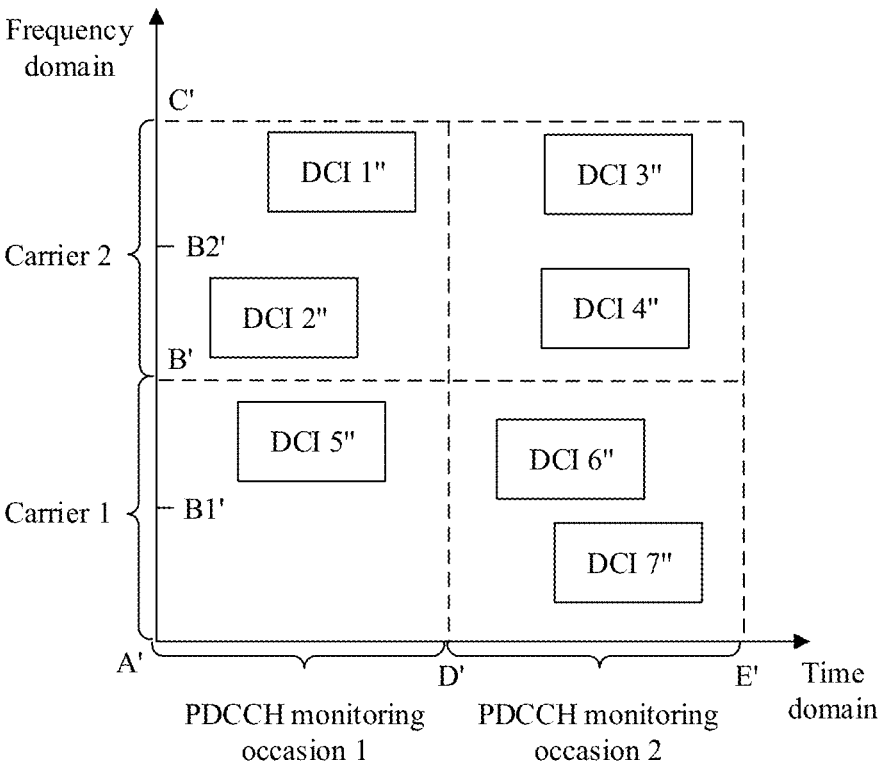
FIG. 6 is still another schematic diagram of PDCCH monitoring occasions according to an embodiment of this application.

For example, when the terminal device monitors the first DCI based on a configuration parameter of a control-resource set or a control-resource set group whose index value is 1, the index value that corresponds to the first DCI and that is of the control-resource set or the control-resource set group is 1. For example, as shown in FIG. 6, it is assumed that two control-resource set groups are configured for a carrier 2, and the terminal device monitors DCI 1" and DCI 3" based on a control-resource set group 0 on both a PDCCH monitoring occasion 1 and a PDCCH monitoring occasion 2. In this case, it may be considered that index values that correspond to the DCI 1" and the DCI 3" and that are of control-resource set groups are both 0. The terminal device monitors DCI 2" and DCI 4" based on a control-resource set group 1 on both the PDCCH monitoring occasion 1 and the PDCCH monitoring occasion 2. In this case, it may be considered that index values that correspond to the DCI 2" and the DCI 4" and that are of control-resource set groups are both 1.

Optionally, an index value that corresponds to the target DCI and that is of the first parameter is the largest one or the smallest one of the index values of the first parameter that correspond to the first DCI.

For example, the terminal device may determine the target DCI by using one of the following five sequences based on the index values of the first parameter that correspond to the first DCI.

Sequence A: The terminal device first determines DCI that is on the at least one PDCCH monitoring occasion and that is on the first carrier, then determines DCI that is on the first carrier and that is on the first PDCCH monitoring occasion, and then determines, based on the index values of the first parameter, the target DCI in the DCI that is on the first carrier and that is on the first PDCCH monitoring occasion. The first carrier may be a carrier having a largest number or a carrier having a smallest number in configured carriers.

For example, the first carrier may be the carrier having the smallest number in the configured carriers. In this case, as shown in FIG. 4, the terminal device first determines that DCI that is on the carrier 1 and that is on the two PDCCH monitoring occasions is the DCI 5, the DCI 6, the DCI 7, and the DCI 8, then determines DCI, namely, the DCI 7 and the DCI 8, on the carrier 1 and on the first PDCCH monitoring occasion (a PDCCH monitoring occasion, namely, the PDCCH monitoring occasion 2, having a larger number in time domain in the PDCCH monitoring occasion 1 and the PDCCH monitoring occasion 2), then obtains an index value that corresponds to the DCI 7 and that is of the first parameter and an index value that corresponds to the DCI 8 and that is of the first parameter, namely, the index value 0 that corresponds to the DCI 7 and that is of the first parameter and the index value 1 that corresponds to the DCI 8 and that is of the first parameter, and determines DCI corresponding to a larger index value of the first parameter as the target DCI, to be specific, uses the DCI 7 as the target DCI, or determines DCI corresponding to a smaller index value of the first parameter as the target DCI, to be specific, uses the DCI 8 as the target DCI.

For another example, the first carrier may be the carrier having the largest number in the configured carriers. In this case, as shown in FIG. 5, the terminal device first determines that DCI that is on the carrier 2 and that is on two PDCCH monitoring occasions is DCI 1', DCI 2', and the DCI 3', and then determines DCI, namely, DCI 3', on the carrier 2 and on the first PDCCH monitoring occasion (a PDCCH monitoring occasion, namely, the PDCCH monitoring occasion 2, having a larger number in time domain in a PDCCH monitoring occasion 1 and the PDCCH monitoring occasion 2). In this case, an index value that corresponds to the DCI 3' and that is of the first parameter may be considered as a largest value, or may be considered as a smallest value. In this case, the target DCI is determined as the DCI 3'.

For another example, the first carrier may be the carrier having the largest number in the configured carriers. In this case, as shown in FIG. 7, the terminal device first determines that DCI that is on the carrier 2 and that is on two PDCCH monitoring occasions is the DCI a, the DCI b, the DCI c, the DCI d, and the DCI e, then determines DCI, namely, the DCI c, the DCI d, and the DCI e, on the carrier 2 and on the first PDCCH monitoring occasion (a PDCCH monitoring occasion, namely, the PDCCH monitoring occasion 2, having a larger number in time domain in a PDCCH monitoring occasion 1 and the PDCCH monitoring occasion 2), and then based on an index value that corresponds to the DCI c and that is of the first parameter, an index value that corresponds to the DCI d and that is of the first parameter, and an index value that corresponds to the DCI e and that is of the first parameter, namely, an index value 0 that corresponds to the DCI c and that is of the first parameter, an index value 1 that corresponds to the DCI d and that is of the first parameter, and an index value 2 that corresponds to the DCI e and that is of the first parameter, determines DCI that corresponds to a largest index value of the first parameter as the target DCI, that is, determines the target DCI as the DCI e, or determines DCI that corresponds to a smallest index value of the first parameter as the target DCI, that is, determines the target DCI as the DCI c.

Sequence B: The terminal device first determines DCI that is on the at least one PDCCH monitoring occasion and that is on the first PDCCH monitoring occasion, then determines DCI that is on the first PDCCH monitoring occasion and that is on the first carrier, and then determines, based on the index values of the first parameter, the target DCI in the DCI that is on the first PDCCH monitoring occasion and that is on the first carrier. The first carrier may be a carrier having a largest number or a carrier having a smallest number in configured carriers, or may be a carrier having a largest number or a carrier having a smallest number in carriers on the first PDCCH monitoring occasion.

For example, the first carrier may be the carrier having the largest number in the configured carriers. As shown in FIG. 4, the terminal device first determines that DCI that is on the first PDCCH monitoring occasion (a PDCCH monitoring occasion, namely, the PDCCH monitoring occasion 2, having a larger number in time domain in the PDCCH monitoring occasion 1 and the PDCCH monitoring occasion 2) and that is on the two PDCCH monitoring occasions is the DCI 3, the DCI 4, the DCI 7, and the DCI 8, then determines DCI, namely, the DCI 3 and the DCI 4, on the first PDCCH monitoring occasion and on the carrier 2, then separately obtains an index value that corresponds to the DCI 3 and that is of the first parameter and an index value that corresponds to the DCI 4 and that is of the first parameter, namely, the index value 0 that corresponds to the DCI 3 and that is of the first parameter and the index value 1 that corresponds to the DCI 4 and that is of the first parameter, and determines DCI corresponding to a largest index value of the first parameter as the target DCI, that is, determines the DCI 4 as the target DCI, or determines DCI corresponding to a smallest index value of the first parameter as the target DCI, that is, determines the DCI 3 as the target DCI.

For another example, the first carrier may be the carrier having the smallest number in the configured carriers. As shown in FIG. 5, the terminal device first determines that DCI that is on the first PDCCH monitoring occasion (a PDCCH monitoring occasion, namely, the PDCCH monitoring occasion 2, having a larger number in time domain in a PDCCH monitoring occasion 1 and the PDCCH monitoring occasion 2) and that is on the two PDCCH monitoring occasions is the DCI 3', the DCI 5', and the DCI 6', then determines DCI, namely, the DCI 5' and the DCI 6', on the first PDCCH monitoring occasion and on the carrier 1, and then separately obtains an index value that corresponds to the DCI 5' and that is of the first parameter and an index value that corresponds to the DCI 6' and that is of the first parameter, where the index value that corresponds to the DCI 5' and that is of the first parameter is 0, and the index value that corresponds to the DCI 6' and that is of the first parameter is 1. In this case, the terminal device determines DCI corresponding to a largest index value of the first parameter as the target DCI, that is, determines the DCI 6' as the target DCI, or determines DCI corresponding to a smallest index value of the first parameter as the target DCI, that is, determines the DCI 5' as the target DCI.

For example, the first carrier may be the carrier having the largest number in the configured carriers. As shown in FIG. 7, the terminal device first determines that DCI that is on the first PDCCH monitoring occasion (a PDCCH monitoring occasion, namely, the PDCCH monitoring occasion 2, having a larger number in time domain in a PDCCH monitoring occasion 1 and the PDCCH monitoring occasion 2) and that is on the two PDCCH monitoring occasions is the DCI c, the DCI d, the DCI e, the DCI h, and the DCI i, then determines DCI, namely, the DCI c, the DCI d, and the DCI e, on the first PDCCH monitoring occasion and on the carrier 2, and then separately obtains an index value that corresponds to the DCI c and that is of the first parameter, an index value that corresponds to the DCI d and that is of the first parameter, and an index value that corresponds to the DCI e and that is of the first parameter. That is, the index value that corresponds to the DCI c and that is of the first parameter is 0, the index value that corresponds to the DCI d and that is of the first parameter is 1, and the index value that corresponds to the DCI e and that is of the first parameter is 2. The terminal device determines DCI corresponding to a largest index value of the first parameter as the target DCI, that is, determines the DCI e as the target DCI, or determines DCI corresponding to a smallest index value of the first parameter as the target DCI, that is, determines the DCI c as the target DCI.

Sequence C: Optionally, the terminal device first determines DCI that is on the at least one PDCCH monitoring occasion and that is on the first PDCCH monitoring occasion, then determines DCI that is on the first PDCCH monitoring occasion and that corresponds to a largest or smallest index value of the first parameter, and then determines, in the DCI, DCI on the first carrier as the target DCI. The first carrier may be a carrier having a largest number or a carrier having a smallest number in configured carriers, may be a carrier having a largest number or a carrier having a smallest number in carriers on the first PDCCH monitoring occasion, or may be a carrier having a largest number or a carrier having a smallest number in carriers corresponding to a largest or smallest index value of the first parameter on the first PDCCH monitoring occasion.

For example, the first carrier may be the carrier having the smallest number in the configured carriers. As shown in FIG. 7, the terminal device first determines that DCI that is on the first PDCCH monitoring occasion (a PDCCH monitoring occasion, namely, the PDCCH monitoring occasion 2, having a larger number in time domain in a PDCCH monitoring occasion 1 and the PDCCH monitoring occasion 2) and that is on the two PDCCH monitoring occasions is the DCI c, the DCI d, the DCI e, the DCI h, and the DCI i, then separately obtains an index value that corresponds to the DCI c and that is of the first parameter, an index value that corresponds to the DCI d and that is of the first parameter, an index value that corresponds to the DCI e and that is of the first parameter, an index value that corresponds to the DCI h and that is of the first parameter, and an index value that corresponds to the DCI i and that is of the first parameter. That is, the index value that corresponds to the DCI c and that is of the first parameter is 0, the index value that corresponds to the DCI d and that is of the first parameter is 1, the index value that corresponds to the DCI e and that is of the first parameter is 2, the index value that corresponds to the DCI h and that is of the first parameter is 0, and the index value that corresponds to the DCI i and that is of the first parameter is 1. Based on the index value that corresponds to the DCI c and that is of the first parameter, the index value that corresponds to the DCI d and that is of the first parameter, the index value that corresponds to the DCI e and that is of the first parameter, the index value that corresponds to the DCI h and that is of the first parameter, and the index value that corresponds to the DCI i and that is of the first parameter, the terminal device determines that DCI corresponding to the largest one of the index values of the first parameter is the DCI e and the DCI i, and then determines the DCI i as the target DCI based on the DCI i on the carrier 1.

Sequence D: The terminal device first determines DCI that is on the at least one PDCCH monitoring occasion and that corresponds to a largest or smallest index value of the first parameter, then determines, in the DCI, DCI on the first PDCCH monitoring occasion, and then determines, in the DCI, DCI on the first carrier as the target DCI. The first carrier may be a carrier having a largest number or a carrier having a smallest number in configured carriers, may be a carrier having a largest number or a carrier having a smallest number in carriers on the first PDCCH monitoring occasion, or may be a carrier having a largest number or a carrier having a smallest number in carriers corresponding to a largest or smallest index value of the first parameter on the first PDCCH monitoring occasion.

For example, the first carrier may be the carrier having the largest number in the configured carriers. As shown in FIG. 6, the terminal device first determines DCI corresponding to the largest one of the index values corresponding to the first parameters on the two PDCCH monitoring occasions, and separately obtains an index value of the DCI 2", an index value of the DCI 4", and an index value of DCI 7". That is, the DCI corresponding to the largest index value is the DCI 2", the DCI 4", and the DCI 7". Then, because DCI on the first PDCCH monitoring occasion (a PDCCH monitoring occasion, namely, the PDCCH monitoring occasion 2, having a larger number in time domain in the PDCCH monitoring occasion 1 and the PDCCH monitoring occasion 2) is the DCI 4" and the DCI 7", the terminal device determines DCI, namely, the DCI 4", on the first PDCCH monitoring occasion and on the carrier 2. The target DCI is the DCI 4". For another example, as shown in FIG. 6, the terminal device first determines DCI corresponding to the smallest one of the index values corresponding to the first parameters on the two PDCCH monitoring occasions, and separately obtains an index value of the DCI 1", an index value of the DCI 3", an index value of DCI 5", and an index value of DCI 6". That is, the DCI corresponding to the smallest index value is the DCI 1", the DCI 3", the DCI 5", and the DCI 6". Then, because DCI on the first PDCCH monitoring occasion (a PDCCH monitoring occasion, namely, the PDCCH monitoring occasion 2, having a larger number in time domain in the PDCCH monitoring occasion 1 and the PDCCH monitoring occasion 2) is the DCI 3" and the DCI 6", the terminal device determines DCI, namely, the DCI 3", on the first PDCCH monitoring occasion and on the carrier 2. The target DCI is the DCI 3".

Optionally, the first parameter in this embodiment of this application may alternatively be a PUCCH resource or a PUCCH resource group.

Specifically, the terminal device determines, based on a PUCCH resource indicated by using the monitored first DCI or a PUCCH resource group to which the PUCCH resource belongs, an index value that corresponds to the first DCI and that is of the PUCCH resource or the PUCCH resource group.

For example, when the PUCCH resource indicated by using the first DCI monitored by the terminal device belongs to a PUCCH resource group 1, the index value that corresponds to the first DCI and that is of the PUCCH resource or the PUCCH resource group is 1.

Optionally, the first parameter in this embodiment of this application may alternatively be a HARQ process number or a HARQ process number group.

Specifically, the terminal device determines, based on a HARQ process number indicated by using the monitored first DCI or a HARQ process number group to which the HARQ process number belongs, an index value that corresponds to the first DCI and that is of the HARQ process number or the HARQ process number group.

For example, when the HARQ process number indicated by using the first DCI monitored by the terminal device belongs to a HARQ process number group 1, the index value that corresponds to the first DCI and that is of the HARQ process number or the HARQ process number group is 1.

There may be the following two cases of determining the target DCI based on the index values of the first parameter that correspond to the first DCI.

Case A: When there is one piece of first DCI, the target DCI is the first DCI.

When there is one piece of first DCI, that an index value that corresponds to the target DCI and that is of the first parameter is the largest one or the smallest one of the index values of the first parameter that correspond to the first DCI may be understood as that the index value that corresponds to the target DCI and that is of the first parameter is the index value that corresponds to the first DCI and that is of the first parameter. In this case, the index value that corresponds to the first DCI and that is of the first parameter may be used as a smallest value or may be used as a largest value.

For example, as shown in FIG. 5, based on the foregoing sequence A, it is first determined that the DCI that is on the carrier 2 and that is on the two PDCCH monitoring occasions is the DCI 1', the DCI 2', and the DCI 3'. Then, the DCI, namely, the DCI 3', on the carrier 2 and on the first PDCCH monitoring occasion (the PDCCH monitoring occasion, namely, the PDCCH monitoring occasion 2, having a larger number in time domain in the PDCCH monitoring occasion 1 and the PDCCH monitoring occasion 2) is determined. Then, the index value that corresponds to the DCI 3' and that is of the first parameter is obtained. That is, the index value that corresponds to the DCI 3' and that is of the first parameter is 1. In this case, the index value that corresponds to the DCI 3' and that is of the first parameter may be used as the largest value, or may be used as the smallest value. That is, the target DCI is the DCI 3'.

Case B: When there are a plurality of pieces of first DCI, the terminal device needs to determine one piece of first DCI in the plurality of pieces of first DCI as the target DCI.

Specifically, the terminal device may use, as the target DCI, first DCI corresponding to the smallest one or the largest one of the index values of the first parameter that correspond to the plurality of pieces of first DCI. That is, the target DCI is DCI corresponding to the smallest one or the largest one of the index values of the first parameter that correspond to the plurality of pieces of first DCI.

When there are a plurality of pieces of first DCI, that an index value that corresponds to the target DCI and that is of the first parameter is the largest one or the smallest one of the index values of the first parameter that correspond to the first DCI may be understood as that the index value that corresponds to the target DCI and that is of the first parameter is the largest one or the smallest one of the index values of the first parameter that correspond to the plurality of pieces of first DCI.

As shown in FIG. 6, the terminal device first obtains an index value that corresponds to each piece of DCI and that is of the first parameter. For example, index values of the first parameter that correspond to the DCI 1", the DCI 3", the DCI 5", and the DCI 6" are 0, and index values of the first parameter that correspond to the DCI 2", the DCI 4", and the DCI 7" is 1. Then, the target DCI is further determined based on the DCI 3" and the DCI 4" that are located on the carrier 2 and that are in the four pieces of DCI on the first PDCCH monitoring occasion (the PDCCH monitoring occasion, namely, the PDCCH monitoring occasion 2, having a larger number in time domain in the PDCCH monitoring occasion 1 and the PDCCH monitoring occasion 2). It may be considered that the first DCI is the DCI 3" and the DCI 4". When the target DCI is determined based on a smallest index value of the first parameter, the target DCI is the DCI 3". Alternatively, when the target DCI is determined based on a largest index value of the first parameter, the target DCI is the DCI 4". Alternatively, the target DCI may be further determined based on DCI on the carrier 1, but the network device and the terminal device need to reach an agreement in advance.

It should be understood that the terminal device may first determine the last PDCCH monitoring occasion, and further determine, on the PDCCH monitoring occasion, an index value that corresponds to each piece of DCI and that is of the first parameter. For example, in FIG. 6, the terminal device determines index values of the first parameter that correspond to the DCI 3" and the DCI 4" on the carrier 2 on the PDCCH monitoring occasion 2, and further determines that the target DCI is the DCI 3".

If there are at least three pieces of first DCI, in the at least three pieces of first DCI, an index value that corresponds to one piece of first DCI and that is of the first parameter is the smallest, an index value that corresponds to one piece of first DCI and that is of the first parameter is the largest, and an index value that corresponds to one piece of first DCI and that is of the first parameter is between the index values of first parameter that correspond to the two pieces of first DCI, the target DCI is either of the two pieces of first DCI (where an index value that corresponds to one piece of first DCI and that is of the first parameter is the smallest, and an index value that corresponds to the other piece of first DCI and that is of the first parameter is the largest). As shown in FIG. 7, the terminal device first obtains an index value that corresponds to each piece of DCI and that is of the first parameter. For example, index values of the first parameter that correspond to the DCI a, the DCI c, the DCI f, and the DCI h are 0, index values of the first parameter that correspond to the DCI d and the DCI i are 1, and index values of the first parameter that correspond to the DCI b, the DCI e, and the DCI g are 2. Then, the target DCI is further determined based on the DCI c, the DCI d, and the DCI e that are on the carrier 2 and that are in five pieces of DCI on the first PDCCH monitoring occasion (the PDCCH monitoring occasion, namely, the PDCCH monitoring occasion 2, having a larger number in time domain in the PDCCH monitoring occasion 1 and the PDCCH monitoring occasion 2). It may be considered that the first DCI is the DCI c, the DCI d, and the DCI e. When the target DCI is determined based on a smallest index value of the first parameter, the target DCI is the DCI c. Alternatively, when the target DCI is determined based on a largest index value of the first parameter, the target DCI is the DCI d. Alternatively, the target DCI may be further determined based on DCI on the carrier 1, but the network device and the terminal device need to reach an agreement in advance. Optionally, whether the index value that corresponds to the target DCI and that is of the first parameter is the largest one or the smallest one of the index values of the first parameter that correspond to the first DCI depends on a stipulation of a communications protocol or the network device.

If it is stipulated in the communications protocol that a PUCCH resource indicated by using DCI corresponding to a largest index value of the first parameter is used as a resource for carrying the scheduled HARQ-ACK feedback bits, the terminal device needs to determine, as the target DCI, first DCI corresponding to the largest one of the index values of the first parameter that correspond to the first DCI.

For example, as shown in FIG. 5, if the first DCI determined by the terminal device based on the sequence A is the DCI 3', an index value that corresponds to the DCI 3' and that is of the first parameter may be used as a largest value. That is, the DCI 3' is the target DCI.

If it is stipulated in the communications protocol that a PUCCH resource indicated by using DCI corresponding to a smallest index value of the first parameter is used as a resource for carrying the scheduled HARQ-ACK feedback bits, the terminal device needs to determine, as the target DCI, first DCI corresponding to the smallest one of the index values of the first parameter that correspond to the first DCI.

For example, as shown in FIG. 4, if the first DCI determined by the terminal device based on the sequence A is the DCI 7 or DCI 8, there are two pieces of first DCI, and DCI, namely, the DCI 8, corresponding to a smaller one of an index value that corresponds to the DCI 7 and that is of the first parameter and an index value that corresponds to the DCI 8 and that is of the first parameter should be used as the target DCI.

For another example, as shown in FIG. 5, if the first DCI determined by the terminal device based on the sequence A is the DCI 3', an index value that corresponds to the DCI 3' and that is of the first parameter may be used as a smallest value. That is, the DCI 3' is the target DCI.

Optionally, the DCI monitored on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

For example, as shown in FIG. 4, there are two PDCCH monitoring occasions. In the DCI monitored on the two PDCCH monitoring occasions, the DCI 1, the DCI 2, the DCI 3, and the DCI 4 are carried on the carrier 2, the DCI 5, the DCI 6, the DCI 7, and the DCI 8 are carried on the carrier 1. The target DCI, namely, the DCI 3, is carried on the carrier 2 having a larger number in the carrier 1 and the carrier 2.

For example, as shown in FIG. 5, there are two PDCCH monitoring occasions. In the DCI monitored on the two PDCCH monitoring occasions, the DCI 1', the DCI 2', and the DCI 3' are carried on the carrier 2', and DCI 4', the DCI 5', and the DCI 6' are carried on the carrier 1'. The target DCI, namely, the DCI 3', is carried on the carrier 2' having a larger number in the carrier 1' and the carrier 2'.

For another example, as shown in FIG. 6, there are two PDCCH monitoring occasions. In the DCI monitored on the two PDCCH monitoring occasions, the DCI 1", the DCI 2", the DCI 3", and the DCI 4" are carried on the carrier 2", and the DCI 5", the DCI 6" and the DCI 7" are carried on the carrier 1'. The target DCI is the DCI 3" or the DCI 4". That is, the DCI 3" or the DCI 4" is carried on the carrier 2' having a larger number in the carrier 1' and the carrier 2'.

Optionally, at least one of a plurality of carriers includes at least two first parameters.

That at least one of a plurality of carriers includes at least two first parameters may be understood as that a first parameter on the at least one of the plurality of carriers may be divided into at least two parts. For example, as shown in FIG. 4 to FIG. 6, DCI monitored on at least one PDCCH monitoring occasion is carried on two carriers, and each of the two carriers includes two first parameters. For example, as shown in FIG. 4, the carrier 1 includes two first parameters, and the two first parameters are respectively A-B1 and B1-B. For another example, the carrier 2 may also include two first parameters, and the two first parameters are respectively B-B2 and B2-C. As shown in FIG. 7, DCI monitored on at least one PDCCH monitoring occasion is carried on two carriers, and each of the two carriers includes three first parameters. For example, the carrier 1''' includes three first parameters, and the three first parameters are respectively A"-B1", B1"-B2", and B2"-B". For another example, the carrier 2''' may also include three first parameters, and the three first parameters are respectively B"-B3", B3"-B4", and B4"-C".

The network device also needs to perform step 330. For details, refer to the descriptions in step 330. Details are not described herein again.

The method 300 may further include step 340.

Step 340: Determine, based on a DAI value indicated by using the target DCI, the quantity of the HARQ-ACK bits carried on the same PUCCH resource.

The PUCCH resource indicated by using the target DCI is further used to carry a NACK feedback bit corresponding to the monitored DCI.

A DAI value is a DAI value carried in DCI.

A DAI value indicated by using DCI is described in detail by using the following two cases as examples.

Optionally, the DAI value indicated by using the DCI represents a quantity of pieces of DCI sorted ahead of the DCI when the DCI is used as the current last piece of DCI and the current last piece of DCI. The DCI sequence may be determined based on one of the foregoing sequences A, B, C, and D. Specifically, the DCI sequence may alternatively be considered as that a DAI indication sequence is jointly determined based on a PDCCH monitoring occasion, a carrier number, and the first parameter.

Optionally, a DCI sequence rule or a DAI indication sequence rule is determined first based on the carrier number, then based on a PDCCH monitoring occasion sequence, and then based on the index values of the first parameter; is determined first based on a PDCCH monitoring occasion sequence, then based on the carrier number, and then based on the index values of the first parameter; is determined first based on the index values of the first parameter, then based on a PDCCH monitoring occasion sequence, and then based on the carrier number; or first based on the carrier number, then based on the index values of the first parameter, and then based on a PDCCH monitoring occasion sequence.

It should be understood that the quantity of pieces of DCI herein includes a quantity of all delivered DCI on the at least one PDCCH monitoring occasion, namely, a quantity of all PDSCHs, namely, a total quantity of HARQ-ACK bits corresponding to the at least one PDCCH monitoring occasion.

Optionally, the DAI value indicated by using the DCI represents a quantity of all pieces of DCI sorted ahead of the DCI when the DCI is used as the current last piece of DCI in a control-resource set or a control-resource set group. In other words, a value of a DAI in each control-resource set or a control-resource set group is separately assigned.

Specifically, 1 is added to a first buffer value when the DAI value indicated by using the target DCI is less than a DAI value indicated by using second DCI; the quantity of the HARQ-ACK bits carried on the same PUCCH resource is determined based on a sum of the first buffer value to which 1 is added and the DAI value indicated by using the target DCI.

An index value that corresponds to the second DCI and that is of the first parameter is different from the index value that corresponds to the target DCI and that is of the first parameter.

A DAI value is a DAI value carried in DCI.

Optionally, the DAI value is any integer from 1 to 4.

Optionally, the first DCI and the second DCI are on a same PDCCH monitoring occasion.

Optionally, the first DCI and the second DCI are on a same carrier.

Optionally, the first DCI is determined as the target DCI by using the index value that corresponds to the second DCI and that is of the first parameter and the index values of the first parameter that correspond to the first DCI, and an interpretation of a DAI in the second DCI and an interpretation of a DAI in the first DCI are determined based on this.

Optionally, a sequence of the second DCI and the first DCI is determined by using the index value that corresponds to the second DCI and that is of the first parameter and the index values of the first parameter that correspond to the first DCI, and an interpretation of a DAI in the second DCI and an interpretation of a DAI in the first DCI are determined based on this. If the first DCI is sorted after the second DCI, the terminal device determines the quantity of the HARQ-ACK bits on the PUCCH resource based on the DAI in the first DCI. In addition, the terminal device also determines, based on the index value of the PUCCH resource indicated by using the first DCI, the PUCCH resource carrying the HARQ-ACK.

Optionally, when a DAI value indicated by using the first DCI is less than the DAI value indicated by using the second DCI, the terminal device needs to add 1 to the first buffer value, and determines, based on the sum of the first buffer value to which 1 is added and the DAI value indicated by using the target DCI, the quantity of the HARQ-ACK bits carried on the same PUCCH resource, to avoid a case in which when the network device sends more than four pieces of DCI and a value of a DAI indication indicated by using the DCI does not exceed 4, the terminal device cannot determine an actual quantity of HARQ-ACK bits based on the DAI value indicated by using the DCI.

For example, the terminal device monitors DCI 1 on the first PDCCH monitoring occasion, monitors DCI 2 on a second PDCCH monitoring occasion, and the first PDCCH monitoring occasion is earlier than the second PDCCH monitoring occasion. If a DAI value indicated by using the DCI 1 is greater than a DAI value indicated by using the DCI 2, to be specific, the network device sends more than four pieces of DCI, and the network device assigns a value of a DAI indicated by using the DCI from zero, when the terminal device monitors the DCI 2, the terminal device needs to add 1 to a current buffer value as an updated buffer value, and determines, based on the updated buffer value and a DAI value carried in the DCI 2, the quantity of the HARQ-ACK bits carried on the same PUCCH resource.

For another example, the terminal device monitors DCI 1 and DCI 2 on the first PDCCH monitoring occasion. If a DAI value indicated by using the DCI 1 is greater than a DAI value indicated by using the DCI 2, and it is determined, based on one of the sequence A, the sequence B, the sequence C, and the sequence D, that the DCI 1 is sorted after the DCI 2, the first buffer value remains unchanged. If a DAI value indicated by using the DCI 1 is less than a DAI value indicated by using the DCI 2, and it is determined, based on one of the sequences A, B, C, and D, that the DCI 1 is sorted after the DCI 2, 1 is added to the first buffer value.

Optionally, the DCI monitored on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

Optionally, at least one of a plurality of carriers includes at least two first parameters.

The method 300 may further include step 350.

Step 350: Receive the HARQ-ACK feedback bits on the PUCCH resource.

The HARQ-ACK feedback bits are carried on the same PUCCH resource. The PUCCH resource carrying the HARQ-ACK feedback information is determined by the terminal device based on the index values of the first parameter that correspond to first DCI on the first PDCCH monitoring occasion. The first PDCCH monitoring occasion is the last PDCCH monitoring occasion in the at least one PDCCH monitoring occasion. The first parameter is a control-resource set or a control-resource set group.

An index value that corresponds to DCI monitored on the last PDCCH monitoring occasion in the at least one determined PDCCH monitoring occasion and that is of the control-resource set or an index value that corresponds to the DCI and that is of the control-resource set group is used to determine a PUCCH resource carrying a HARQ-ACK feedback bit scheduled by using the DCI, so that the network device can control a PUCCH resource used for a HARQ-ACK feedback of the terminal device, to improve uplink resource transmission performance and avoid interference in uplink transmission.

This application further provides a method 400 for determining a hybrid automatic repeat request-acknowledgment (HARQ-ACK) resource. FIG. 8 is a schematic flowchart of the method 400 for determining a HARQ-ACK resource according to an embodiment of this application from a perspective of interaction between a network device and a terminal device. As shown in FIG. 4, the method 400 may include step 410 to step 440. The following describes the steps in the method 400 in detail.

Step 410: Send downlink control information (DCI) on at least one PDCCH monitoring occasion, where HARQ-ACK feedback bits scheduled by using the DCI are carried on a same PUCCH resource.

Each piece of DCI on a first PDCCH monitoring occasion is used to indicate the PUCCH resource, and the first PDCCH monitoring occasion is the last PDCCH monitoring occasion in the at least one PDCCH monitoring occasion.

Step 420: Determine the at least one PDCCH monitoring occasion, monitor the downlink control information (DCI) on the at least one PDCCH monitoring occasion, where the HARQ-ACK feedback bits scheduled by using the DCI are carried on the same PUCCH resource.

For step 410, refer to the descriptions of step 310 in the method 300. For step 420, refer to the descriptions of step 320 in the method 300. Details are not described herein again.

Step 430: Determine the first PDCCH monitoring occasion, where the first PDCCH monitoring occasion is the last PDCCH monitoring occasion in the at least one PDCCH monitoring occasion, and each piece of DCI monitored on the first PDCCH monitoring occasion is used to indicate the PUCCH resource.

Optionally, PUCCH resources indicated by using DCI monitored on a second PDCCH monitoring occasion are the same, and the second PDCCH monitoring occasion is any one of the at least one PDCCH monitoring occasion. For example, as shown in FIG. 4, the terminal device determines two PDCCH monitoring occasions based on the case 1 in the method 300. PUCCH resources indicated by using DCI monitored on the two PDCCH monitoring occasions are the same. To be specific, PUCCH resources indicated by using DCI 1, DCI 2, DCI 3, DCI 4, DCI 5, DCI 6, DCI 7, and DCI 8 are the same.

For another example, as shown in FIG. 7, the terminal device determines two PDCCH monitoring occasions based on the case 2 in the method 300. PUCCH resources indicated by using DCI monitored on the two PDCCH monitoring occasions are the same. To be specific, PUCCH resources indicated by using DCI a, DCI b, DCI c, DCI d, DCI e, DCI f, DCI g, DCI h, and DCI i are the same.

PUCCH resources indicated by using all DCI monitored on any one of the at least one determined PDCCH monitoring occasion are limited to be the same, to improve uplink transmission performance and avoid interference in uplink transmission.

Optionally, PUCCH resources indicated by using DCI monitored on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

For example, as shown in FIG. 4, the third PDCCH monitoring occasion may be a PDCCH monitoring occasion 1. In this case, PUCCH resources indicated by using DCI monitored on a carrier 1 on the PDCCH monitoring occasion 1 are the same. To be specific, PUCCH resources indicated by using DCI 5 and DCI 6 are the same. PUCCH resources indicated by using DCI monitored on a carrier 2 on the PDCCH monitoring occasion 1 are the same. To be specific, PUCCH resources indicated by using DCI 1 and DCI 2 are the same. Alternatively, the third PDCCH monitoring occasion may be a PDCCH monitoring occasion 2. In this case, PUCCH resources indicated by using DCI monitored on a carrier 1 on the PDCCH monitoring occasion 2 are the same. To be specific, PUCCH resources indicated by using DCI 7 and DCI 8 are the same. PUCCH resources indicated by using DCI monitored on a carrier 2 on the PDCCH monitoring occasion 2 are the same. To be specific, PUCCH resources indicated by using DCI 3 and DCI 4 are the same.

For another example, as shown in FIG. 7, the third PDCCH monitoring occasion may be a PDCCH monitoring occasion 1. In this case, PUCCH resources indicated by using DCI monitored on a carrier 1 on the PDCCH monitoring occasion 1 are the same. To be specific, PUCCH resources indicated by using DCI f and DCI g are the same. PUCCH resources indicated by using DCI monitored on a carrier 2 on the PDCCH monitoring occasion 1 are the same. To be specific, PUCCH resources indicated by using DCI a and DCI b are the same. Alternatively, the third PDCCH monitoring occasion may be a PDCCH monitoring occasion 2. In this case, PUCCH resources indicated by using DCI monitored on a carrier 1 on the PDCCH monitoring occasion 2 are the same. To be specific, PUCCH resources indicated by using DCI h and DCI i are the same. PUCCH resources indicated by using DCI monitored on a carrier 2 on the PDCCH monitoring occasion 2 are the same. To be specific, PUCCH resources indicated by using DCI c, DCI d, and DCI e are the same. PUCCH resources indicated by using all DCI monitored on a same carrier on any one of the at least one determined PDCCH monitoring occasion are limited to be the same, to improve uplink transmission performance and avoid interference in uplink transmission.

The network device also needs to perform step 430. For details, refer to the descriptions in step 430. Details are not described herein again.

Step 440: The network device receives the HARQ-ACK feedback bits on the PUCCH resource.

The HARQ-ACK feedback bits are carried on the same PUCCH resource. The PUCCH resource carrying HARQ-ACK feedback information is determined by the terminal device based on first DCI on the first PDCCH monitoring occasion. The first DCI is on the first PDCCH monitoring occasion. The first PDCCH monitoring occasion is the last PDCCH monitoring occasion in the at least one PDCCH monitoring occasion. Each piece of DCI monitored on the first PDCCH monitoring occasion is used to indicate the PUCCH resource.

The foregoing describes in detail the methods for determining a hybrid automatic repeat request-acknowledgment (HARQ-ACK) resource according to the embodiments of this application with reference to FIG. 3 to FIG. 8. The following describes in detail apparatuses for determining a hybrid automatic repeat request-acknowledgment (HARQ-ACK) resource according to the embodiments of this application with reference to FIG. 9 to FIG. 12.

FIG. 9 is a schematic diagram of an apparatus 900 for determining a hybrid automatic repeat request-acknowledgment (HARQ-ACK) resource according to this application. The apparatus may be a terminal device or a chip in a terminal device. As shown in FIG. 9, the apparatus 900 may include a transceiver module 910 and a processing module 920.

In a possible implementation in which the apparatus 900 is a terminal device, the apparatus 900 is configured to perform procedures and steps corresponding to the terminal device in the method 300.

The processing module 920 is configured to determine at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource.

The processing module 920 is further configured to determine target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

Optionally, an index value that corresponds to the target DCI and that is of the first parameter is the largest one or the smallest one of the index values of the first parameter that correspond to the first DCI.

Optionally, the processing module 920 is further configured to determine, based on a DAI value indicated by using the target DCI, a quantity of the HARQ-ACK bits carried on the same PUCCH resource.

Optionally, the processing module 920 is further specifically configured to: add 1 to a first buffer value when the DAI value indicated by using the target DCI is less than a DAI value indicated by using second DCI, where the second DCI is on the first PDCCH monitoring occasion, and an index value that corresponds to the second DCI and that is of the first parameter is different from the index value that corresponds to the target DCI and that is of the first parameter; and determine, based on a sum of the first buffer value to which 1 is added and the DAI value indicated by using the target DCI, the quantity of the HARQ-ACK bits carried on the PUCCH resource.

Optionally, the DCI monitored on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

Optionally, at least one of the plurality of carriers includes at least two first parameters.

In a possible implementation in which the apparatus 900 is a terminal device, the apparatus 900 is configured to perform procedures and steps corresponding to the terminal device in the method 400.

The processing module 910 is configured to determine at least one physical downlink control channel (PDCCH) monitoring occasion, where HARQ-ACK feedback bits scheduled by using downlink control information (DCI) monitored on the at least one PDCCH monitoring occasion are carried on a same physical uplink control channel (PUCCH) resource.

The processing module 910 is further configured to determine a first PDCCH monitoring occasion, where the first PDCCH monitoring occasion is the last PDCCH monitoring occasion in the at least one PDCCH monitoring occasion, and each piece of DCI monitored on the first PDCCH monitoring occasion is used to indicate the PUCCH resource.

Optionally, PUCCH resources indicated by using DCI monitored on a second PDCCH monitoring occasion are the same, and the second PDCCH monitoring occasion is any one of the at least one PDCCH monitoring occasion.

Optionally, PUCCH resources indicated by using DCI monitored on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

It should be understood that a specific process in which the modules perform the foregoing corresponding steps have been described in detail in the foregoing method embodiments, and for brevity, details are not described herein again.

In this embodiment of this application, the apparatus in FIG. 9 may alternatively be a chip or a chip system such as a system on chip (system on chip, SoC). Correspondingly, the transceiver module may be a transceiver circuit of the chip. This is not limited herein.

Figure 10:
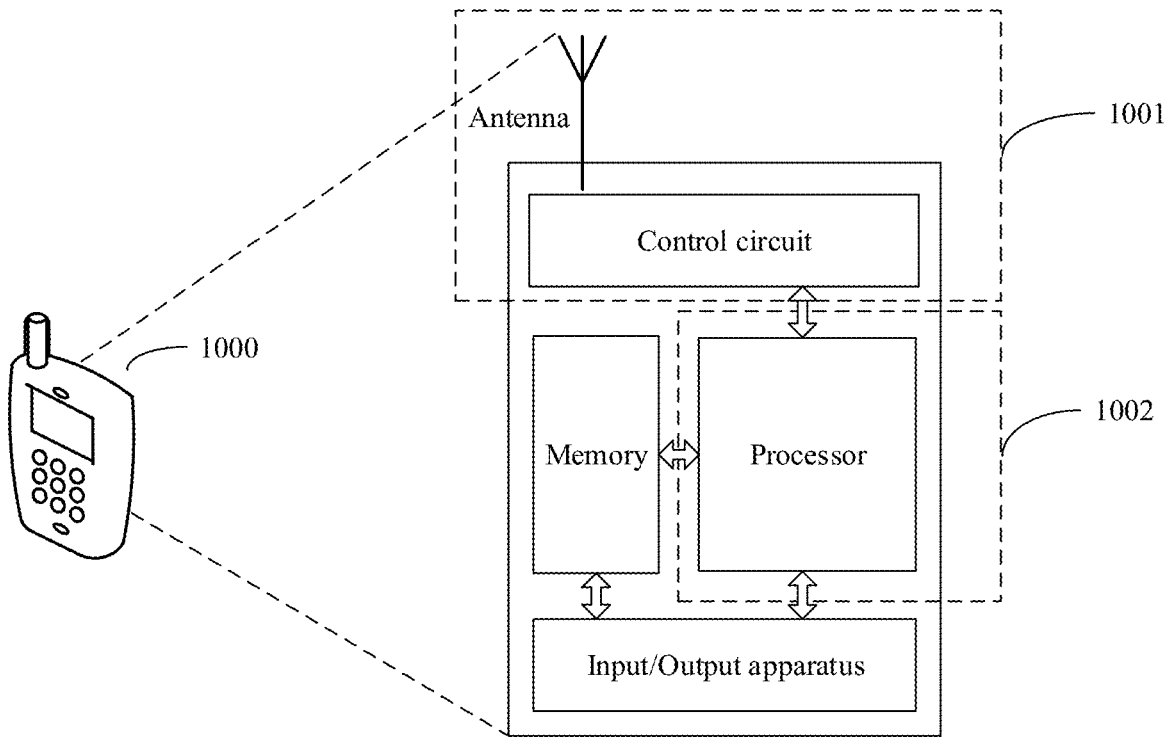
FIG. 10 is a schematic structural diagram of a terminal device 1000 applicable to an embodiment of this application.

FIG. 10 is a schematic structural diagram of a terminal device 1000 applicable to an embodiment of this application. The terminal device 1000 may be applied to the system shown in FIG. 1. For ease of description, FIG. 10 shows only main components of the terminal device. As shown in FIG. 10, the terminal device 1000 includes a processor, a memory, a control circuit, an antenna, and an input/output apparatus. The processor is configured to control the antenna and the input/output apparatus to send and receive a signal. The memory is configured to store a computer program. The processor is configured to invoke the computer program from the memory and run the computer program, to perform a corresponding procedure and/or operation performed by the terminal device in the data transmission method provided in this application. Details are not described herein again.

A person skilled in the art may understand that for ease of description, FIG. 10 shows only one memory and one processor. An actual terminal device may include a plurality of processors and a plurality of memories. The memory may also be referred to as a storage medium, a storage device, or the like. This is not limited in this embodiment of this application.

Figure 11:
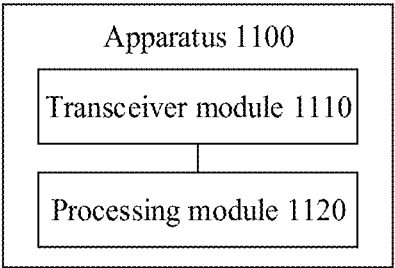
FIG. 11 is a schematic diagram of an apparatus 1100 for determining a hybrid automatic repeat request-acknowledgment (HARQ-ACK) resource according to this application.

FIG. 11 is a schematic diagram of an apparatus 1100 for determining a hybrid automatic repeat request-acknowledgment (HARQ-ACK) resource according to this application. The apparatus may be a network device or a chip in a network device. As shown in FIG. 11, the apparatus 1100 may include a transceiver module 1110.

In a possible implementation in which the apparatus 1100 is a network device, the apparatus 1100 is configured to perform procedures and steps corresponding to the network device in the method 300.

The transceiver module 1110 is configured to send downlink control information (DCI) on at least one physical downlink control channel (PDCCH) monitoring occasion, where HARQ-ACK feedback bits scheduled by using the DCI are carried on a same physical uplink control channel (PUCCH) resource.

A processing module 1120 is further configured to determine target DCI based on index values of a first parameter that correspond to first DCI, where the first DCI is on a first PDCCH monitoring occasion, the first PDCCH monitoring occasion is the last PDCCH monitoring occasion in the at least one PDCCH monitoring occasion, the first parameter is a control-resource set or a control-resource set group, and the target DCI is used to indicate the PUCCH resource.

Optionally, an index value that corresponds to the target DCI and that is of the first parameter is the largest one or the smallest one of the index values of the first parameter that correspond to the first DCI.

Optionally, the DCI sent on the at least one PDCCH monitoring occasion is carried on a plurality of carriers, and the target DCI is carried on a carrier having a largest number in the plurality of carriers, or the target DCI is carried on a carrier having a smallest number in the plurality of carriers.

Optionally, at least one of the plurality of carriers includes at least two first parameters.

In a possible implementation in which the apparatus 1100 is a network device, the apparatus 1100 is configured to perform procedures and steps corresponding to the network device in the method 400.

The transceiver module 1110 is configured to send downlink control information (DCI) on at least one physical downlink control channel (PDCCH) monitoring occasion, where HARQ-ACK feedback bits scheduled by using the DCI are carried on a same PUCCH resource.

Each piece of DCI on a first PDCCH monitoring occasion is used to indicate the PUCCH resource, and the first PDCCH monitoring occasion is the last PDCCH monitoring occasion in the at least one PDCCH monitoring occasion.

The transceiver module 1110 is further configured to receive the HARQ-ACK feedback bits on the PUCCH resource.

Optionally, PUCCH resources indicated by using DCI sent on a second PDCCH monitoring occasion are the same, and the second PDCCH monitoring occasion is any one of the at least one PDCCH monitoring occasion.

Optionally, PUCCH resources indicated by using DCI sent on a first carrier on a third PDCCH monitoring occasion are the same, and the third PDCCH monitoring occasion is any one of the at least one PDCCH monitoring occasion, where the first carrier is a carrier having a largest number on the third PDCCH monitoring occasion; the first carrier is any carrier on the third PDCCH monitoring occasion; or the first carrier is a carrier having a smallest number on the third PDCCH monitoring occasion.

It should be understood that a specific process in which the modules perform the foregoing corresponding steps have been described in detail in the foregoing method embodiments, and for brevity, details are not described herein again.

In this embodiment of this application, the apparatus in FIG. 11 may alternatively be a chip or a chip system such as a system on chip (system on chip, SoC). Correspondingly, the transceiver module may be a transceiver circuit of the chip. This is not limited herein.

Figure 12:
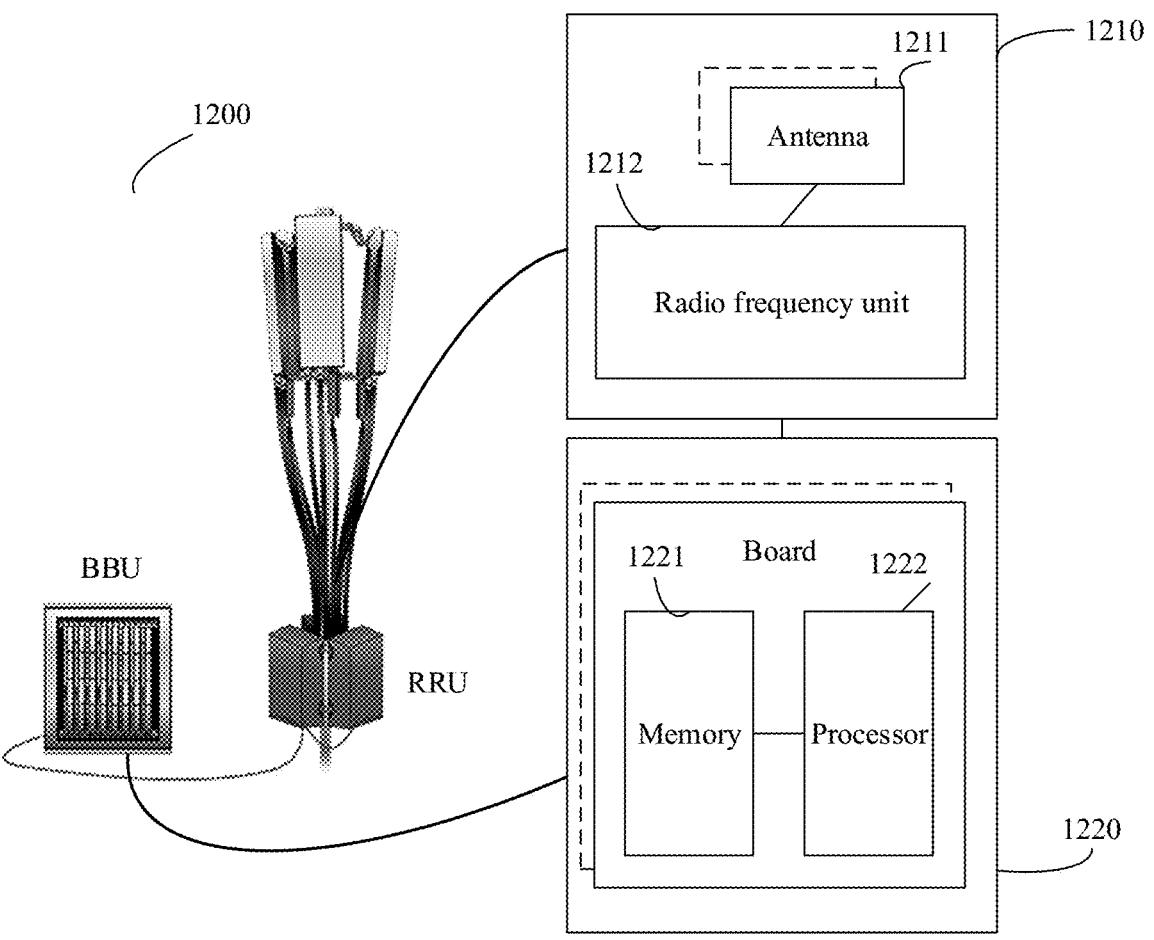
FIG. 12 is a schematic structural diagram of a network device 1200 applicable to an embodiment of this application.

FIG. 12 is a schematic structural diagram of a network device 1200 applicable to an embodiment of this application. The network device 1200 may be configured to implement functions of the network device in the foregoing data transmission method. For example, FIG. 12 may be a schematic structural diagram of a base station. As shown in FIG. 12, the network device may be applied to the system shown in FIG. 1.

The network device 1200 may include one or more radio frequency units such as a remote radio unit (remote radio unit, RRU) 1210 and one or more baseband units (base band unit, BBU). The baseband unit may also be referred to as a digital unit (digital unit, DU) 1220. The RRU 1210 may be referred to as a transceiver module, and corresponds to the transceiver module 1110 in FIG. 11. Optionally, the transceiver module 1210 may also be referred to as a transceiver, a transceiver circuit, a transceiver, or the like, and may include at least one antenna 1211 and a radio frequency unit 1212. Optionally, the transceiver module 1210 may include a receiving module and a sending module. The receiving module may correspond to a receiver (or referred to as a receiver or a receiving circuit), and the sending module may correspond to a transmitter (or referred to as a transmitter or a transmitting circuit). The RRU 1210 is mainly configured to: send and receive radio frequency signals and perform conversion between a radio frequency signal and a baseband signal, for example, is configured to send the DCI in the foregoing embodiments to a terminal device. The BBU 1220 is mainly configured to perform baseband processing, control the base station, and so on. The RRU 1210 and the BBU 1220 may be physically disposed together, or may be physically disposed separately, where that is, the base station is a distributed base station.

The BBU 1220 is a control center of the network device, may also be referred to as a processing module, and is mainly configured to implement baseband processing functions such as channel coding, multiplexing, modulation, and spectrum spreading. For example, the BBU (the processing unit) 1220 may be configured to control the network device 1200 to perform an operation procedure related to the network device in the foregoing method embodiments.

In an example, the BBU 1220 may include one or more boards, and a plurality of boards may jointly support a radio access network (such as an LTE system or a 5G system) in a single access standard, or may separately support radio access networks in different access standards. The BBU 1220 further includes a memory 1221 and a processor 1222. The memory 1221 is configured to store a necessary instruction and necessary data. For example, the memory 1221 stores the codebook and the like in the foregoing embodiments. The processor 1222 is configured to control the base station to perform a necessary action, for example, is configured to control the base station to perform an operation procedure related to the network device in the foregoing method embodiments. The memory 1221 and the processor 1222 may serve one or more boards. In other words, a memory and a processor may be separately disposed on each board. Alternatively, a plurality of boards may share a same memory and a same processor. In addition, a necessary circuit may be further disposed on each board.

It should be understood that the network device 1200 shown in FIG. 12 can implement functions of the network device in the method embodiments in FIG. 3 to FIG. 8. Operations and/or functions of the modules in the network device 1200 are separately used to implement corresponding procedures performed by the network device in the method embodiments in this application. To avoid repetition, detailed descriptions are appropriately omitted herein. The structure of the network device shown in FIG. 12 is merely a possible form, and should not constitute any limitation on the embodiments of this application. In this application, there may be a network device structure in another form in the future.

An embodiment of this application further provides a communications system, including the foregoing one or more network devices and one or more terminal devices.

This application further provides a computer-readable storage medium. The computer-readable storage medium stores an instruction. When the instruction is run on a computer, the computer is enabled to perform steps performed by the network device in the methods shown in FIG. 3 to FIG. 8.

This application further provides a computer-readable storage medium. The computer-readable storage medium stores an instruction. When the instruction is run on a computer, the computer is enabled to perform steps performed by the terminal device in the methods shown in FIG. 3 to FIG. 8.

This application further provides a computer program product including an instruction. When the computer program product is run on a computer, the computer is enabled to perform steps performed by the network device in the methods shown in FIG. 3 to FIG. 8.

This application further provides a computer program product including an instruction. When the computer program product is run on a computer, the computer is enabled to perform steps performed by the terminal device in the methods shown in FIG. 3 to FIG. 8.

This application further provides a chip, including a processor. The processor is configured to read and run a computer program stored in a memory, to perform a corresponding operation and/or procedure performed by the terminal device in the methods for determining a hybrid automatic repeat request-acknowledgment (HARQ-ACK) resource provided in this application. Optionally, the chip further includes the memory. The memory is connected to the processor through a circuit or a cable. The processor is configured to read the computer program from the memory and execute the computer program. Further, optionally, the chip further includes a communications interface. The processor is connected to the communications interface. The communications interface is configured to receive data and/or information that need/needs to be processed. The processor obtains the data and/or information from the communications interface, and processes the data and/or information. The communications interface may be an input/output interface.

This application further provides a chip, including a processor. The processor is configured to invoke and run a computer program stored in a memory, to perform a corresponding operation and/or procedure performed by the network device in the methods for determining a hybrid automatic repeat request-acknowledgment (HARQ-ACK) resource provided in this application. Optionally, the chip further includes the memory. The memory is connected to the processor through a circuit or a cable. The processor is configured to read the computer program from the memory and execute the computer program. Further, optionally, the chip further includes a communications interface. The processor is connected to the communications interface. The communications interface is configured to receive data and/or information that need/needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a hybrid automatic repeat request-acknowledgment (HARQ-ACK) resource performed by a terminal device or a chip of the terminal device, comprising:

determining, based on downlink control information (DCI) monitored on a plurality of physical downlink control channel (PDCCH) monitoring occasions, at least one PDCCH monitoring occasion from the plurality of PDCCH monitoring occasions, wherein HARQ-ACK feedback bits scheduled by using DCI monitored on the at least one PDCCH monitoring occasion are carried on a same physical uplink control channel (PUCCH) resource; and determining target DCI indicating the PUCCH resource, wherein the target DCI corresponds to a largest one of index values of a control-resource set group corresponding to first DCI, wherein a plurality of carriers are on a last PDCCH monitoring occasion in the at least one PDCCH monitoring occasion, wherein the first DCI is on a carrier having a largest carrier number of the plurality of carriers, wherein the last PDCCH monitoring occasion in the at least one PDCCH monitoring occasion is a PDCCH monitoring occasion with a largest index, and wherein the control-resource set group comprises one or more control-resource sets.

2. The method according to claim 1, wherein the method further comprises:

determining, based on a downlink assignment index (DAI) value indicated by the target DCI, a quantity of the HARQ-ACK feedback bits carried on the same PUCCH resource.

3. The method according to claim 2, wherein determining the quantity of the HARQ-ACK feedback bits carried on the same PUCCH resource comprises:

increasing a buffer value by 1 when the DAI value indicated by the target DCI is less than a DAI value indicated by second DCI on the last PDCCH monitoring occasion, wherein the second DCI corresponds to an index value of the control-resource set group that is different from the index value that corresponds to the target DCI; and determining, based on a sum of the buffer value and the DAI value, the quantity of the HARQ-ACK feedback bits carried on the PUCCH resource.

4. The method according to claim 1, wherein the DCI monitored on the at least one PDCCH monitoring occasion is carried on a plurality of carriers, and the target DCI is carried on a carrier having a largest carrier number in the plurality of carriers, or the target DCI is carried on a carrier having a smallest carrier number in the plurality of carriers.

5. The method according to claim 4, wherein at least one of the plurality of carriers comprises at least two control-resource set groups.

6. An apparatus for determining a hybrid automatic repeat request-acknowledgment (HARQ-ACK) resource, comprising: at least one processor, and one or more memories coupled to the at least one processor and storing programming instructions for execution by the at least one processor to perform operations comprising:

determining, based on downlink control information (DCI) monitored on a plurality of physical downlink control channel (PDCCH) monitoring occasions, at least one PDCCH monitoring occasion from the plurality of PDCCH monitoring occasions, wherein HARQ-ACK feedback bits scheduled by using DCI monitored on the at least one PDCCH monitoring occasion are carried on a same physical uplink control channel (PUCCH) resource; and determining target DCI indicating the PUCCH resource, wherein the target DCI corresponds to a largest one of index values of a control-resource set group corresponding to first DCI, wherein a plurality of carriers are on a last PDCCH monitoring occasion in the at least one PDCCH monitoring occasion, wherein the first DCI is on a carrier having a largest carrier number of the plurality of carriers, wherein the last PDCCH monitoring occasion in the at least one PDCCH monitoring occasion is a PDCCH monitoring occasion with a largest index, and wherein the control-resource set group comprises one or more control-resource sets.

7. The apparatus according to claim 6, wherein the operations comprises:

determine, based on a DAI value indicated by the target DCI, a quantity of the HARQ-ACK feedback bits carried on the same PUCCH resource.

8. The apparatus according to claim 7, wherein the operations comprises:

increasing a buffer value by 1 when the DAI value indicated by the target DCI is less than a DAI value indicated by second DCI on the last PDCCH monitoring occasion, wherein:

the second DCI corresponds to an index value of the control-resource set group that is different from the index value that corresponds to the target DCI; and determining, based on a sum of the buffer value and the DAI value, the quantity of the HARQ-ACK feedback bits carried on the PUCCH resource.

9. The apparatus according to claim 8, wherein the DCI monitored on the at least one PDCCH monitoring occasion is carried on a plurality of carriers, and the target DCI is carried on a carrier having a largest carrier number in the plurality of carriers, or the target DCI is carried on a carrier having a smallest carrier number in the plurality of carriers.

10. The apparatus according to claim 9, wherein at least one of the plurality of carriers comprises at least two control-resource set groups.

11. The apparatus according to claim 6, wherein the apparatus is a terminal device or a chip.

12. A non-transitory computer-readable storage medium storing one or more instructions executable by at least one processor to perform operations comprising:

determining, based on downlink control information (DCI) monitored on a plurality of physical downlink control channel (PDCCH) monitoring occasions, at least one PDCCH monitoring occasion from the plurality of PDCCH monitoring occasions, wherein HARQ-ACK feedback bits scheduled by using DCI monitored on the at least one PDCCH monitoring occasion are carried on a same physical uplink control channel (PUCCH) resource; and determining target DCI indicating the PUCCH resource, wherein the target DCI corresponds to a largest one of index values of a control-resource set group corresponding to first DCI, wherein a plurality of carriers are on a last PDCCH monitoring occasion in the at least one PDCCH monitoring occasion, wherein the first DCI is on a carrier having a largest carrier number of the plurality of carriers, wherein the last PDCCH monitoring occasion in the at least one PDCCH monitoring occasion is a PDCCH monitoring occasion with a largest index, and wherein the control-resource set group comprises one or more control-resource sets.

13. The non-transitory computer-readable storage medium according to claim 12, wherein the operations comprises:

determining, based on a downlink assignment index (DAI) value indicated by the target DCI, a quantity of the HARQ-ACK feedback bits carried on the same PUCCH resource.

14. The non-transitory computer-readable storage medium according to claim 13, wherein determining the quantity of the HARQ-ACK feedback bits carried on the same PUCCH resource comprises:

increasing a buffer value by 1 when the DAI value indicated by the target DCI is less than a DAI value indicated by second DCI on the last PDCCH monitoring occasion, wherein the second DCI corresponds to an index value of the control-resource set group that is different from the index value that corresponds to the target DCI, and determining, based on a sum of the buffer value and the DAI value, the quantity of the HARQ-ACK feedback bits carried on the PUCCH resource.

15. The non-transitory computer-readable storage medium according to claim 12, wherein the DCI monitored on the at least one PDCCH monitoring occasion is carried on a plurality of carriers, and the target DCI is carried on a carrier having a largest carrier number in the plurality of carriers, or the target DCI is carried on a carrier having a smallest carrier number in the plurality of carriers.

16. The non-transitory computer-readable storage medium according to claim 15, wherein at least one of the plurality of carriers comprises at least two control-resource set groups.

* * * * *